US008445766B2

(12) United States Patent
Raveendran

(10) Patent No.: US 8,445,766 B2
(45) Date of Patent: May 21, 2013

(54) ELECTRONIC DISPLAY OF SHEET MUSIC

(75) Inventor: Vijayalakshmi Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 54 days.

(21) Appl. No.: 12/712,966

(22) Filed: Feb. 25, 2010

(65) Prior Publication Data

US 2011/0203442 A1 Aug. 25, 2011

(51) Int. Cl.
*G09B 15/02* (2006.01)
(52) U.S. Cl.
USPC ...................... 84/477 R; 84/470 R
(58) Field of Classification Search
USPC ............................. 84/477 R, 470 R
See application file for complete search history.

(56) References Cited

U.S. PATENT DOCUMENTS

| | | | | |
|---|---|---|---|---|
| 4,779,510 A | * | 10/1988 | Van den Abbeel | 84/464 R |
| 4,958,551 A | * | 9/1990 | Lui | 84/462 |
| 4,976,182 A | * | 12/1990 | Obuchi et al. | 84/462 |
| 5,315,057 A | * | 5/1994 | Land et al. | 84/601 |
| 5,315,911 A | * | 5/1994 | Ochi | 84/477 R |
| 5,400,687 A | * | 3/1995 | Ishii | 84/477 R |
| 5,453,569 A | * | 9/1995 | Saito et al. | 84/609 |
| 5,665,927 A | * | 9/1997 | Taki et al. | 84/609 |
| 5,728,960 A | * | 3/1998 | Sitrick | 84/477 R |
| 5,760,323 A | * | 6/1998 | Romero et al. | 84/470 R |
| 5,864,631 A | * | 1/1999 | Shutoh | 382/113 |
| 5,894,100 A | * | 4/1999 | Otsuka | 84/477 R |
| 5,913,259 A | * | 6/1999 | Grubb et al. | 84/610 |
| 5,952,597 A | * | 9/1999 | Weinstock et al. | 84/609 |
| 6,051,769 A | * | 4/2000 | Brown, Jr. | 84/477 R |
| 6,084,168 A | * | 7/2000 | Sitrick | 84/477 R |
| 6,107,559 A | * | 8/2000 | Weinstock et al. | 84/634 |
| 6,156,964 A | * | 12/2000 | Sahai et al. | 84/470 R |
| 6,281,424 B1 | * | 8/2001 | Koike et al. | 84/636 |
| 6,333,455 B1 | * | 12/2001 | Yanase et al. | 84/609 |
| 6,380,474 B2 | * | 4/2002 | Taruguchi et al. | 84/612 |
| 6,392,132 B2 | * | 5/2002 | Uehara | 84/477 R |

(Continued)

FOREIGN PATENT DOCUMENTS

| DE | 102005052890 A1 | 5/2007 |
|---|---|---|
| WO | WO2008100054 A2 | 8/2008 |
| WO | WO2010006639 A1 | 1/2010 |

OTHER PUBLICATIONS

Musical Definitions ©1999-2005 Gary Ewer.*

(Continued)

*Primary Examiner* — David Warren
*Assistant Examiner* — Robert W Horn
(74) *Attorney, Agent, or Firm* — Charles Chesney

(57) ABSTRACT

This disclosure relates to techniques, devices, and systems for displaying sheet music on one or more electronic devices. One example method of displaying sheet music on an electronic device includes receiving a first electronic input that indicates timing information for a musical composition. The method also includes determining, by an electronic device, a timing parameter for the musical composition using the received first electronic input indicating the timing information, and displaying, on the electronic device, sheet music for a first portion of a plurality of portions of the musical composition. The method further includes determining a time duration associated with the first portion based on the timing parameter, and displaying, on the electronic device, sheet music for a second portion of the plurality of portions of the musical composition following an expiration of the time duration.

66 Claims, 10 Drawing Sheets

U.S. PATENT DOCUMENTS

| | | | | |
|---|---|---|---|---|
| 6,459,029 B2* | 10/2002 | Uehara | | 84/477 R |
| 6,483,019 B1* | 11/2002 | Hamilton | | 84/477 R |
| 6,703,549 B1* | 3/2004 | Nishimoto et al. | | 84/609 |
| 6,809,246 B2* | 10/2004 | Errico | | 84/477 R |
| 7,064,261 B2* | 6/2006 | Shao | | 84/477 R |
| 7,161,081 B2* | 1/2007 | Futamase et al. | | 84/622 |
| 7,164,076 B2* | 1/2007 | McHale et al. | | 84/616 |
| 7,183,476 B2* | 2/2007 | Swingle et al. | | 84/477 R |
| 7,297,856 B2* | 11/2007 | Sitrick | | 84/477 R |
| 7,301,092 B1* | 11/2007 | McNally et al. | | 84/612 |
| 7,314,993 B2* | 1/2008 | Nishitani et al. | | 84/612 |
| 7,361,829 B2* | 4/2008 | Uehara | | 84/746 |
| 7,365,261 B2* | 4/2008 | Hirano | | 84/600 |
| 7,375,273 B2* | 5/2008 | Sawyer-Kovelman et al. | | 84/609 |
| 7,432,432 B2* | 10/2008 | Li et al. | | 84/483.2 |
| 7,482,529 B1* | 1/2009 | Flamini et al. | | 84/645 |
| 7,579,541 B2* | 8/2009 | Guldi | | 84/470 R |
| 7,629,527 B2* | 12/2009 | Hiner et al. | | 84/470 R |
| 7,649,134 B2* | 1/2010 | Kashioka | | 84/600 |
| 7,842,871 B2* | 11/2010 | Ishii et al. | | 84/477 R |
| 7,888,578 B2* | 2/2011 | Guo et al. | | 84/609 |
| 7,893,337 B2* | 2/2011 | Lenz | | 84/477 R |
| 7,919,703 B2* | 4/2011 | Hong et al. | | 84/483.1 |
| 2001/0037719 A1* | 11/2001 | Gardner et al. | | 84/478 |
| 2003/0200859 A1 | 10/2003 | Futamase et al. | | |
| 2006/0288842 A1* | 12/2006 | Sitrick et al. | | 84/477 R |
| 2008/0047413 A1* | 2/2008 | Laycock et al. | | 84/477 R |
| 2008/0156171 A1* | 7/2008 | Guldi | | 84/466 |
| 2008/0196575 A1* | 8/2008 | Good | | 84/470 R |
| 2008/0249982 A1* | 10/2008 | Lakowske | | 707/3 |
| 2009/0158915 A1* | 6/2009 | Ishii et al. | | 84/483.1 |
| 2009/0217803 A1* | 9/2009 | Guo et al. | | 84/477 R |
| 2010/0313736 A1* | 12/2010 | Lenz | | 84/477 R |
| 2010/0313737 A1* | 12/2010 | Fahn et al. | | 84/477 R |
| 2012/0227571 A1* | 9/2012 | Sasaki | | 84/477 R |
| 2012/0247305 A1* | 10/2012 | Katsuta | | 84/477 R |

OTHER PUBLICATIONS

TablEdit Software © 1997-2007 Matthieu Leschemelle.*

FreeHand Systems MusicPad Pro Plus, Product Description- datasheet [online] [Retrieved on Feb. 25, 2010] Retrieved from the internet: http://www.samash.com/webapp/wcs/stores/servlet/product_MusicPad%20Pro%20Plus%20Digital%20Sheet%Music%20-Tablet_-1_10052_10002_-49977490?cm_mmc=Froogle-_-Misc%20Computer%20Hardware-_-MusicPad%20-Pro%20Plus%20Digital%20Sheet%20Music%20Tablet-_-FMP-PFH003.

AMAZON.COM, Kindle Wireless Reading Device (6" Display, Global Wireless, Latest Generation), Product Description- datasheet [online]. [Retrieved on Feb. 12, 2010, Retrieved from the internet: <URL: http://www.amazon.com/dp/B0015T963C/?tag=googhydr-20&hvadid=4169696661&ref=pd_s1_93qxhnzinw_e>.

Anonymous Ed—Anonymous: "From MusicReader Community Documentation", Internet Citation, Jan. 7, 2009, pp. 1-29, XP002660379, Retrieved from the Internet: URL: http://web.archive.org/web/20090107092 723/http://docs.musicreader.net/[retrieved on Sep. 29, 2011].

International Search Report and Written Opinion—PCT/US2011/026377—ISA/EPO—Mar. 20, 2012.

* cited by examiner

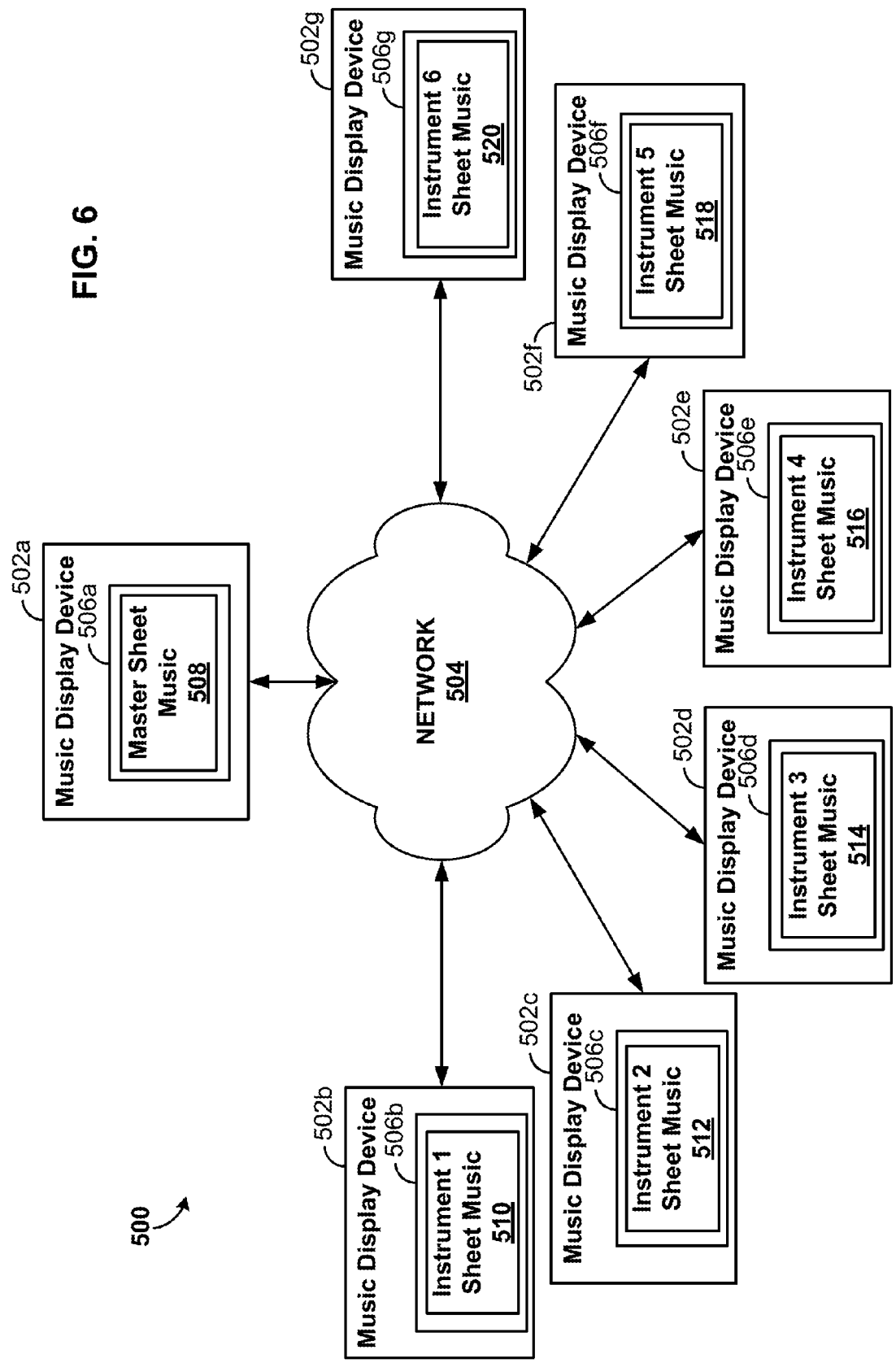

ELECTRONIC DISPLAY OF SHEET MUSIC

TECHNICAL FIELD

This disclosure relates to displaying sheet music, and in particular to displaying sheet music on an electronic device.

BACKGROUND

"Sheet music," or alternatively a "musical score," is used to provide a visual representation of a musical work, such as a musical composition or arrangement. As a form of musical notation, sheet music can include musical notes, symbols, numbers, letters, words, and an arrangement of lines and separating spaces that the foregoing can be placed on or near to convey aspects of the musical work. A musician can then read the sheet music and play a musical instrument in accordance with the information conveyed by the sheet music. Sheet music may be written for a particular musical instrument, or may be written to apply to more than one type of musical instrument.

Historically, sheet music has been printed on paper. Because sheet music for a musical composition can frequently include several pages, a musician playing an instrument and concurrently reading the printed paper sheet music may manually turn or flip the pages of the sheet music at appropriate times, perhaps pausing momentarily to perform the manual action of flipping the page.

Recently, a product that displays music on an electronic display device has been developed. The display device includes a touch screen that can be manually tapped by a musician to advance the display to the next page of the music, or a foot pedal that can be manually actuated to cause the next page to be displayed. Similar to flipping a paper page of sheet music, touching the touch screen or tapping the foot pedal involves a manual action by the musician while the music is being played, and in the case of the foot pedal also adds a hardware component to the musician's set.

SUMMARY

This disclosure relates to techniques, devices, and systems for displaying sheet music on one or more electronic devices.

In a first general aspect, a method of displaying sheet music on an electronic device includes receiving a first electronic input that indicates timing information for a musical composition. The method also includes determining, by an electronic device, a timing parameter for the musical composition using the received first electronic input indicating the timing information, and displaying, on the electronic device, sheet music for a first portion of a plurality of portions of the musical composition. The method further includes determining a time duration associated with the first portion based on the timing parameter, and displaying, on the electronic device, sheet music for a second portion of the plurality of portions of the musical composition following an expiration of the time duration.

In a second general aspect, a computer-readable storage medium includes instructions for causing one or more processors to receive a first electronic input that indicates timing information for a musical composition and determine a timing parameter for the musical composition using the received first electronic input indicating the timing information. The computer-readable storage medium also includes instructions for causing the one or more processors to display, on an electronic device, sheet music for a first portion of a plurality of portions of the musical composition. The computer-readable storage medium further includes instructions for causing the one or more processors to determine a time duration associated with the first portion based on the timing parameter, and display, on the electronic device, sheet music for a second portion of the plurality of portions of the musical composition following an expiration of the time duration.

In a third general aspect, an electronic device includes means for receiving a first electronic input that indicates timing information for a musical composition, and means for determining, by an electronic device, a timing parameter for the musical composition using the received first electronic input indicating the timing information. The electronic device also includes means for displaying, on the electronic device, sheet music for a first portion of a plurality of portions of the musical composition. The electronic device further includes means for determining a time duration associated with the first portion based on the timing parameter, and means for displaying, on the electronic device, sheet music for a second portion of the plurality of portions of the musical composition following an expiration of the time duration.

In a fourth general aspect, an electronic device includes one or more processors, and a display screen. The electronic device also includes a first module operable by the one or more processors to determine a timing parameter for a musical composition using a first electronic input that indicates timing information for the musical composition. The electronic device further includes a second module operable by the one or more processors to determine a time duration associated with a first portion of a plurality of portions of the musical composition based on the timing parameter. The electronic device further includes a third module operable by the one or more processors to display, on the display screen, sheet music for the first portion of the musical composition, and to display, on the display screen, sheet music for a second portion of the plurality of portions of the musical composition following an expiration of the time duration.

The details of one or more aspects are set forth in the accompanying drawings and the description below. Other features, objects, and advantages will be apparent from the description and drawings, and from the claims.

BRIEF DESCRIPTION OF THE DRAWINGS

FIG. 6 is block diagram of an exemplary system that includes a plurality of communicably coupled devices that may each be used to display sheet music.

DETAILED DESCRIPTION

This disclosure describes devices, systems, and techniques for displaying sheet music on one or more electronic devices.

Figure 1:
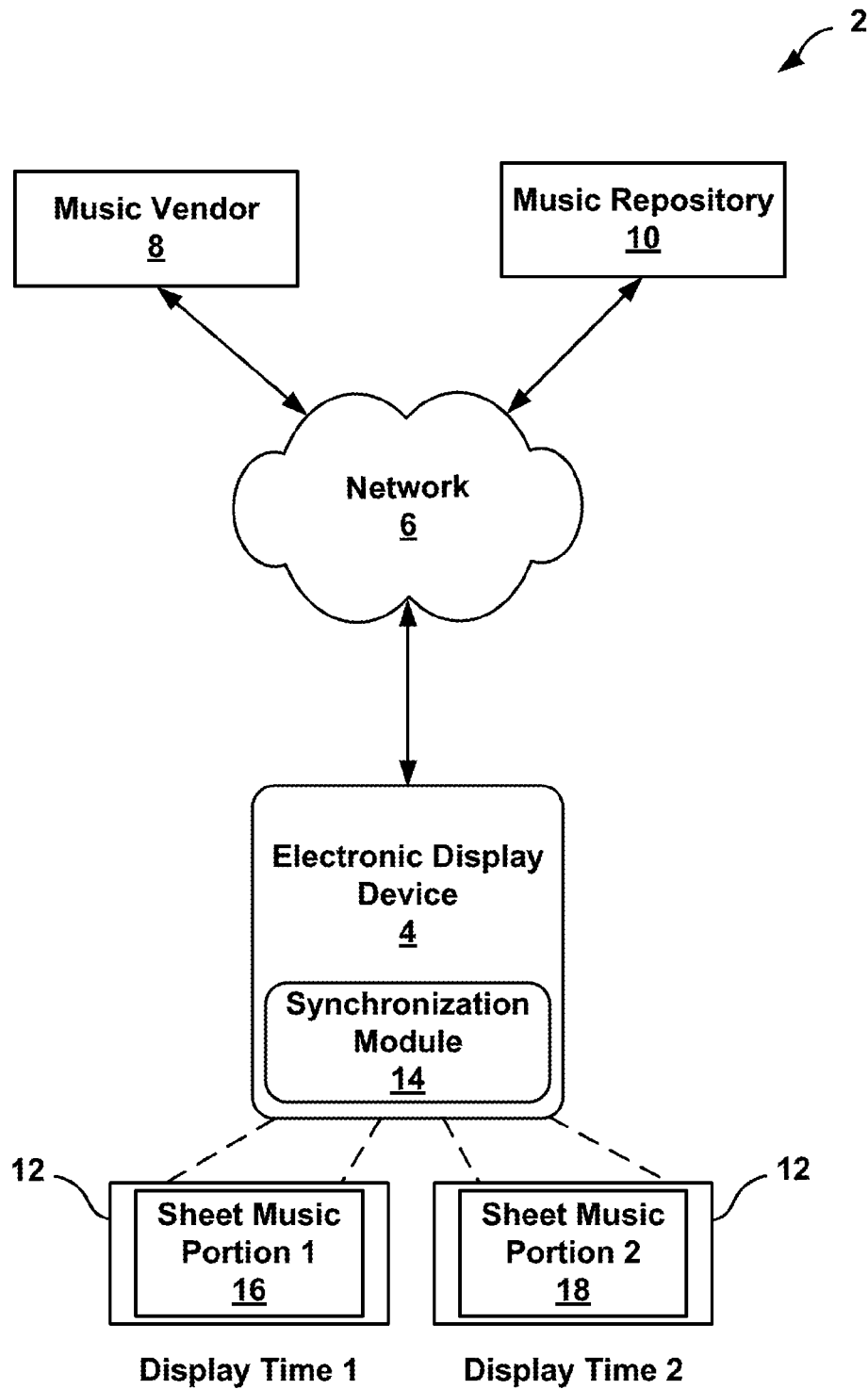
FIG. 1 is a block diagram of a system that includes an exemplary electronic device that may be used to display sheet music.

FIG. 1 is a block diagram of a system 2 that includes an exemplary electronic device 4 that may be used to display sheet music. The electronic device 4 may be communicably coupled to a network 6, over which the electronic device 4 may communicate with a music vendor 8, a music repository 10, and one or more other electronic devices (not shown), each of which may also be communicably coupled to the network 6. For example, the electronic device 4 may communicate with the music vendor 8 over the network 6 to purchase an electronic copy of a musical work, or may obtain an electronic copy of a musical work from the music repository 10 over the network 6. The electronic device 4 may display sheet music for the musical work on an electronic display screen 12 of the electronic device 4.

In the depicted example, the electronic device 4 includes a synchronization module 14. In some examples, the synchronization module 14 can be used to synchronize display of sheet music on the electronic device 4 with a performance of the music. For example, sheet music for a musical work, composition, or arrangement may be partitioned for display on the electronic display 12 into two or more pages or portions of sheet music, and particular pages or portions of the sheet music may be displayed on the electronic display 12 at appropriate times as a musician is playing the musical composition.

Display transitions between pages or portions of the musical composition may occur automatically and without a manual input or other type of input from the musician while the musician is performing the musical composition, according to some examples. For example, the electronic device 4 may display sheet music for a first portion 16 of the musical composition on the display 12 at a first time (e.g., at "Display Time 1" in FIG. 1). The synchronization module 14 may synchronize display of the first portion 16 with the musician's performance of the musical composition, and the device 4 may display sheet music for a second portion 18 of the musical composition on the display 12 at a second time (e.g., at "Display Time 2" in FIG. 1), which may be at or near a time when the musician finishes playing the first portion 16. As such, the musician may focus on performing the musical work without worrying about having to manually turn a page or provide some other type of input while playing the music, or at any time after beginning play of the music, to cause a page change. Because manual page-turning can be distracting to a musician, and in some cases can introduce an undesirable pause in the aural rendition of the musical work when no pause was intended by the composer, the techniques disclosed herein may provide a more satisfying musical experience for the musician, and also for those listening to the musical performance, in some cases.

In some examples, the synchronization module 14 may determine a timing parameter for the musical composition. The device 4 may receive an electronic input that indicates timing information for the musical composition, and the synchronization module 14 may use the input that indicates the timing information to derive the timing parameter. In some examples, the timing information may indicate a tempo for the musical composition. In some examples, the synchronization module 14 may use the timing parameter to determine a time duration associated with a portion of the musical composition, where the musical composition may be partitioned into two or more portions for separate display on the electronic display 12. Sheet music for a first portion 16 of the musical composition may be displayed on the electronic device, a time corresponding to a time duration associated with the first portion may be measured, and sheet music for a second portion 18 of the musical composition may be displayed on the electronic device following an expiration of the time duration. In this fashion, sheet music for the musical composition may be displayed on the electronic device 4, and each portion of the composition may be displayed for a time appropriate for the playing of the portion by a musician.

Network 6 may be a wired or wireless network, or a combination of two or more networks. For example, network 6 may include portions of a local area network (LAN), a wide area network (WAN), the Internet, a wireless phone/communications network, a wireless local area network, and the like. Music vendor 8 may, for instance, be an online music store that sells sheet music for musical compositions on a per-composition basis, for example, or via a subscription-type arrangement where the music vendor provides access to a larger number of musical compositions in return for payment of a predetermined fee. Music repository 10 may, in some examples, be an online public domain collection of musical works, for example. Alternatively, music repository 10 may be any storage location that provides access to musical compositions and is accessible via the network 6. For example, conductors, composers, collectors, or musicians may maintain personal music collections, and music repository 10 may represent such a collection if the owner makes the collection available for sharing.

In some cases, some pieces of sheet music can include personalized modifications to the music, such as notations that indicate suggested fingering, or dynamics or articulation notations. Some examples of sheet music can include augmentations that supplement the sheet music and add a context to the sheet music. For example, a piece of sheet music may include a description of the music, of the music's composer, or of historical aspects related to the music. Alternatively, sheet music may include one or more trivia questions, which may be related to the music in some aspects. For example, questions similar to the "Piano Puzzlers" on the National Public Radio web site are examples of augmentations that may be included in some versions of sheet music that can be displayed according to the techniques, devices, and systems discussed herein.

In various examples, a single electronic device 4, or a collection of two or more electronic devices including device 4, which may be communicably coupled, may be used to display sheet music. For example, a solo musician may use a single electronic device 4 to display sheet music while practicing or performing a musical composition. Two devices 4 may be used, for example, during a music lesson where a student and a teacher each read sheet music from a respective electronic device 4. As another example, each instrument-playing member of a symphony orchestra, as well as the conductor, may read sheet music displayed by a respective electronic device 4 while the orchestra collectively performs a musical work.

A group of musicians physically separated from one another in remote locations may similarly collaborate to collectively or individually perform a musical work. For example, each musician may read sheet music displayed on a respective electronic device 4, and the devices may be communicably coupled over a network 6, such as the Internet, and provide synchronized presentation of the sheet music to coincide with the performance. Aspects of the techniques disclosed herein may permit synchronization of play across a network in a simple and efficient fashion. For example, the techniques disclose herein may avoid extracting and analyzing audio samples, and may operate without compensating for delays in the network. By avoiding these steps, complex processing using sophisticated audio processors may be unnecessary.

Figure 2A:
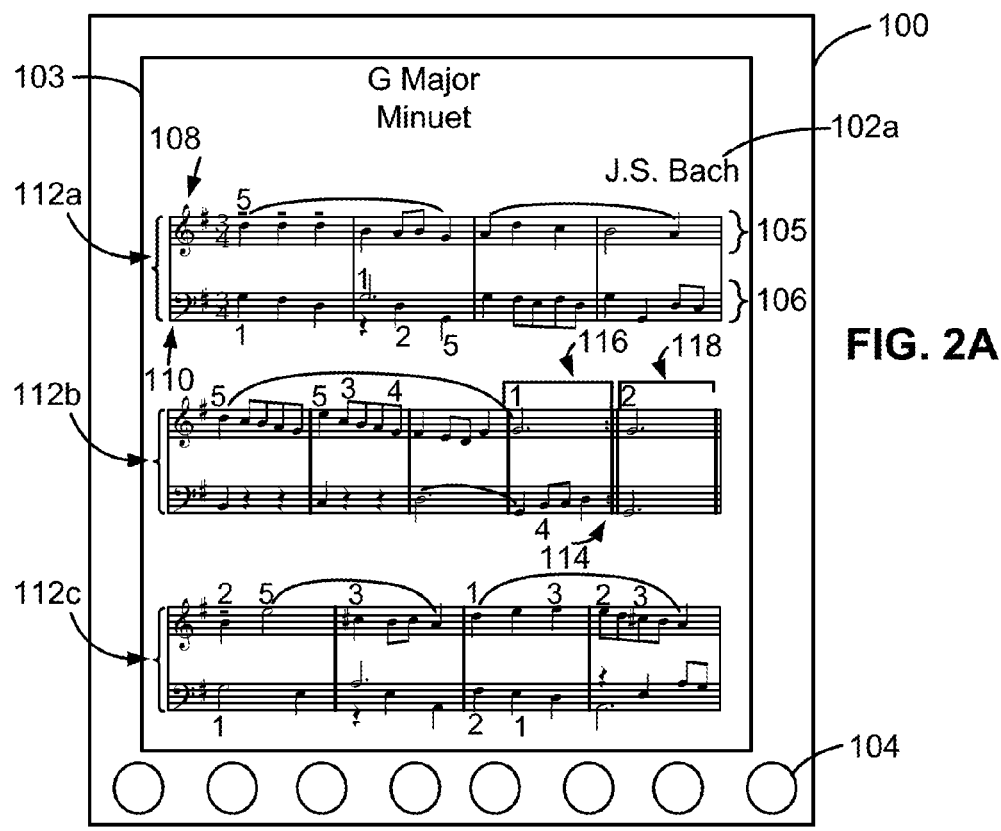
FIGS. 2a and 2b are depictions of example electronic devices that can each be used to display sheet music for a musical composition.
Figure 2B:
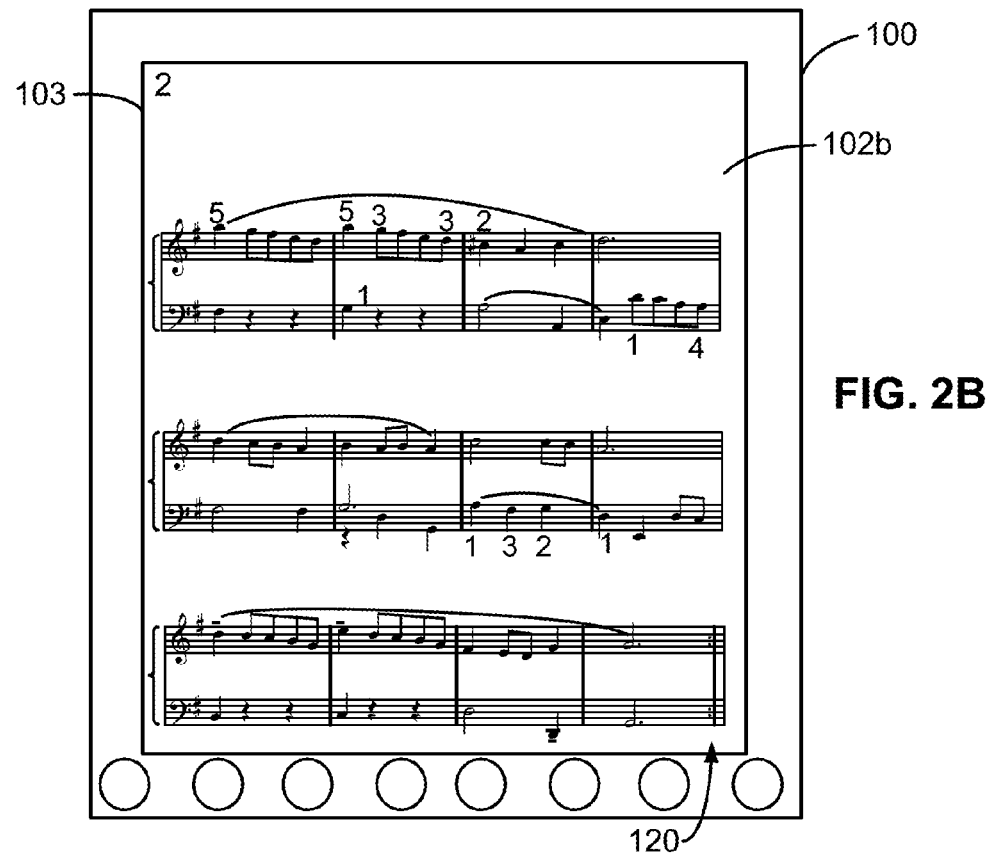

FIGS. 2a-b are depictions of an example electronic device 100 that can be used to display sheet music for a musical composition. For example, electronic device 100 may correspond to the device 4 shown in FIG. 1. In FIG. 2a, a first page 102a of sheet music for an example musical composition or work is displayed on a display 103 of the electronic device. In FIG. 2b, a second page 102b of sheet music for the musical work is displayed. In various examples, the device 100 may synchronize display of the sheet music with a musical performance of the work, and may update the display at appropriate times so that a musician need not make a manual input to cause a page change after beginning play.

For example, the first page 102a may be displayed, as shown in FIG. 2a, while a first portion of the work is being played, and the second page 102b may be displayed, as shown in FIG. 2b, while a second portion of the work is being played. The title of the musical work 100 in this particular non-limiting example is "G Major Minuet," and the composer of the work is "J. S. Bach," as can be seen on the first page 102a.

In some examples, the device 100 may include one or more buttons 104 that a user may use to provide input to interface with the device 100. The depicted example shows eight buttons 104, but in other examples the device 100 may include more or fewer buttons 104, and the buttons may be at different locations on the device 100. In some examples, the buttons 104 may be omitted.

By way of musical notation background, a musical staff is an arrangement of five horizontal lines and four spaces that separate the lines, where each line or space of the musical staff represents a different musical pitch. To use a mathematical analogy, the musical staff may be considered to define a two-dimensional graph, where a horizontal dimension of the staff generally specifies a relative time relationship for musical notes or symbols positioned on the staff, and where a vertical dimension of the staff specifies a pitch relationship for the musical notes. For example, a first note positioned left-of and lower than a second note on the staff will have a lower pitch than the second note, and will be played earlier in time than the second note during a performance of the music.

With reference again to the first page 102a, a first musical staff 105 and a second musical staff 106 are shown. The first musical staff 105 includes a treble clef notation 108 near a left edge of the first staff 105, and the second musical staff 106 includes a bass clef notation 110 near a left edge of the second staff 106. In general, clef notations (e.g., treble clef 108, bass clef 110, or other clef notations) convey a pitch context for the associated staff, and in combination with a vertical position of a note on the staff indicate an absolute pitch for the note.

In this example, the first staff 105 and the second staff 106 are joined together by a brace to collectively form a first grand staff 112a. The first grand staff 112a indicates to a musician that music on the first staff 105 and music on the second staff 106 is to be played concurrently, typically by a single musician. First page 102a also includes a second grand staff 112b and a third grand staff 112c, each of which includes a treble clef staff and a bass clef staff. The depicted musical work is intended to be played on a piano, but other examples of sheet music may be written for other types of musical instruments, and various notational conventions may be used. For example, sheet music for many types of instruments (e.g., trumpet, trombone, flute, saxophone, and others) is typically written on a single staff and defined by either a treble clef 108 or a base clef 110 as appropriate for the particular instrument, but other clef types may also be used. Some musical compositions may be arranged to include three or more staffs joined together for concurrent play by one or more musicians.

In general, sheet music is read from left-to-right and from top-to-bottom. As described above, some examples of sheet music are arranged so that each "line" of the sheet music includes one staff, while other examples, such as the musical work shown in FIGS. 2a-b, are arranged so that each line of the sheet music includes two staffs, and yet other examples can have three or more staffs per line. A musician will be familiar with typical musical notations and conventions that are used for her particular instrument. For example, a pianist playing the musical work in this example begins play at the left edge of the first grand staff 112a, reads music rightward, and after reaching the right edge of the first grand staff 112a begins playing from the left edge of the second grand staff 112b.

While sheet music is generally read from left-to-right and top-to-bottom, various symbols, letters, or words can indicate a deviation in the normal flow of the sheet music. For example, a repeat indicator (e.g., a symbol, letter, or word) may indicate that some or all of the music that precedes the repeat indicator should be repeated one or more times. Similarly, a coda indicator (e.g., a symbol, letter, or word) may indicate a forward jump in the music, which may include skipping over some or all of the music that follows the coda indicator. Other symbols, letters, or words can be used to indicate where playing should resume, or to indicate that playing should stop upon encountering the symbol, letter, or word. These notations that alter the normal left-to-right, top-to-bottom flow of the music may be referred to as order-changing indicia or flow-altering indicia, for example.

A first repeat sign 114 near the end of the second grand staff 112b indicates that play should be repeated once from the beginning of the musical work upon first encountering the first repeat sign 114. In this example, play is to be repeated from the beginning of the work because of a lack of an opposite-facing repeat sign earlier in the work. Such an opposite-facing repeat sign (that is, a symbol like repeat sign 114 but flipped horizontally) would indicate that only the segment of music between the repeat signs should be repeated. Referring again to the depicted example, the first repeat sign 114 is associated with a first ending indicator 116 and a second ending indicator 118, which indicate that a passage that is to repeated should be played differently the second time it is played than the first time it is played. In this example, the section bracketed by the first ending indicator 116 is to be played the first time but skipped the second time, when the section bracketed by the second ending indicator 118 is to be played.

That is, in this example a musician may play the first line 112a and the second line 112b until reaching the first repeat sign 114. The musician may then repeat the first line 112a from the beginning and the second line 112b but may skip the section bracketed by the first ending indicator 116 and instead play the section bracketed by the second ending indicator 118. The musician may then continue by playing the third line 112c, and thereafter the lines on the second page 102b. A second repeat sign 120 at the end of the second page 102b may indicate that the entire work should be repeated, as described above (for example, including a repetition of the passage specified by the first repeat sign 114 on the first page 102a).

The foregoing is intended to describe one example of sheet music for a musical work and how the sheet music may be read. Many variations are possible. For example, the length of musical works can vary widely. Some musical works may span many pages, while others may span relatively fewer pages. Also, more or fewer order-changing indicia may be present in other examples. As described above, a repeat indicator 114 in conjunction with an opposite-facing repeat indicator at an intermediate point in the work (not shown) may indicate that only a portion of music between the repeat indicator 114 and the opposite-facing repeat indicator should be repeated, rather than repeating from the beginning of the work as in this example. Instrument-specific musical notation can also be used. For example, sheet music for a guitar can include fingering notation, and sheet music for a piano can include pedal-related notation, to list just a couple of examples.

Reading sheet music can be very different than, for example, reading a traditional document or a book. For example, apart from general differences in musical notation as compared to letters, words, or symbols of written communicative languages, sheet music notation may call for repetition of a passage or skipping forward in a musical work, as described above and illustrated in the example of FIGS. 2a-b. In some cases, forward or backward jumps within sheet music may be across one or more pages or portions of the sheet music.

In these cases, the electronic device 100 may automatically update the displayed page at appropriate times to coincide with a performance of the work, according to some examples. For example, a musical work that includes eight pages may include a repeat sign at the end of the eighth page that calls for repeating from the beginning of the first page, or from a location on the second page, third page, or other intermediate page. Similarly, a coda sign on the sixth page may call for skipping ahead to the end of the eighth page, to list just a couple of examples. By contrast, written communicative languages do not generally include flow-altering indicia that specify that a previous portion of the document or book should be reread, or that a subsequent portion of the document or book should be skipped.

Figure 3B:
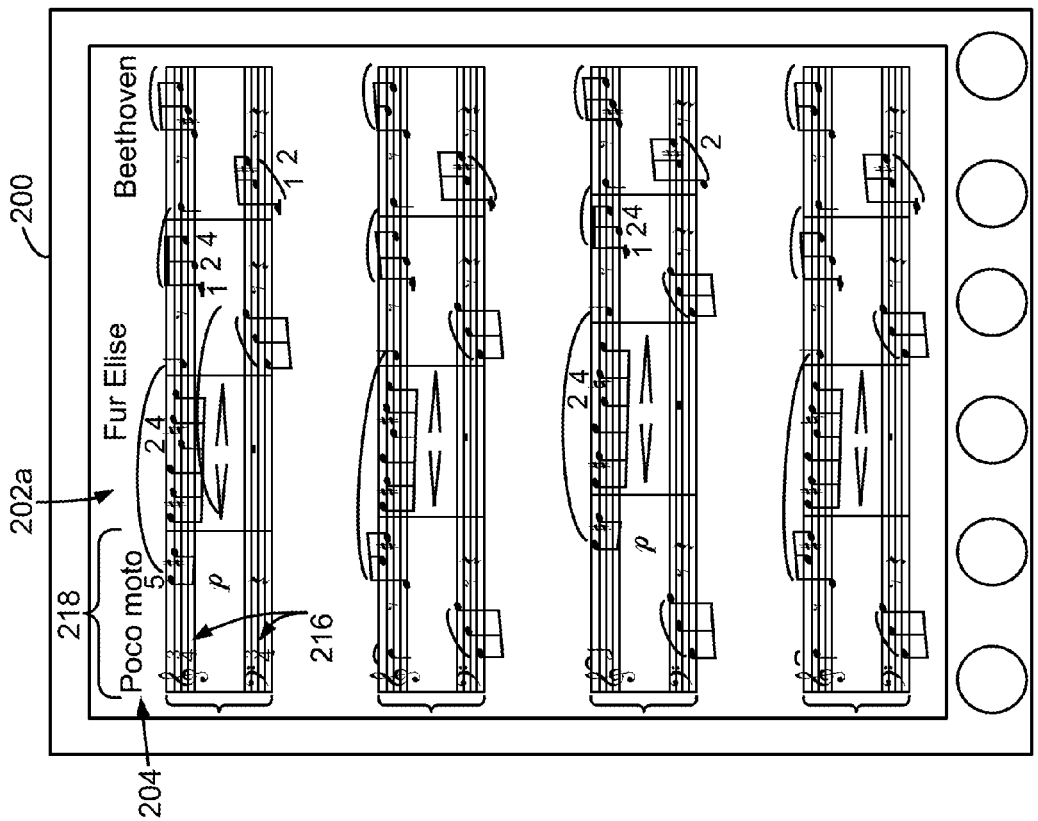
FIGS. 3a, 3b, and 3c are depictions of example electronic devices that can each be used to display sheet music for a musical composition.
Figure 3A:
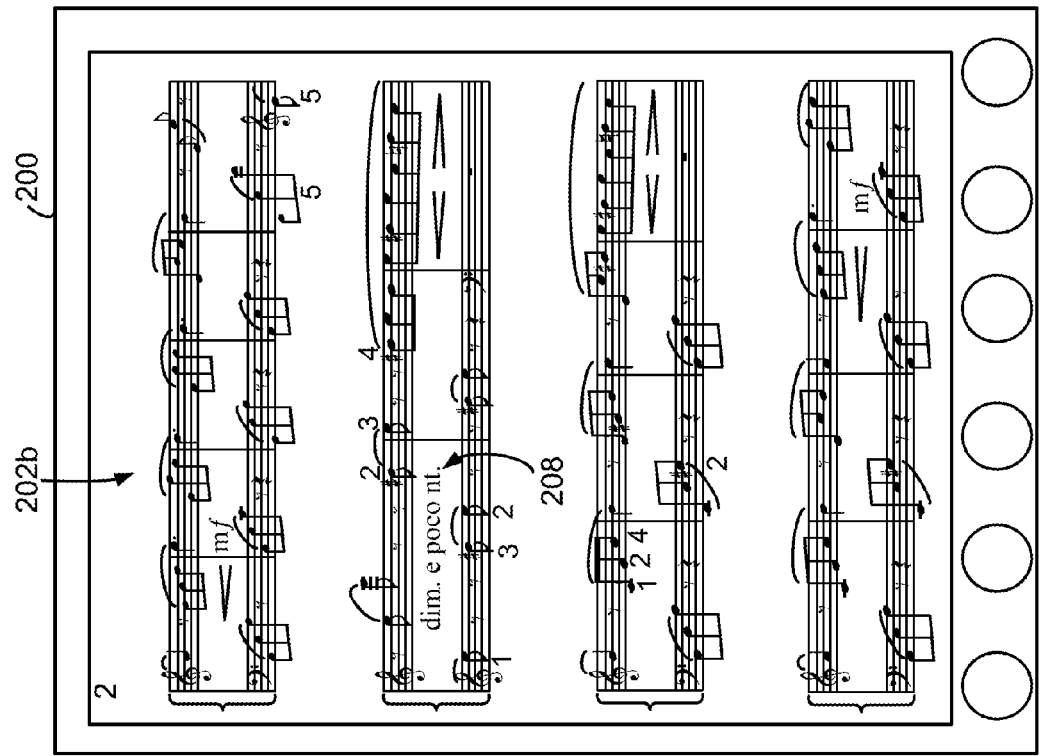
Figure 3C:
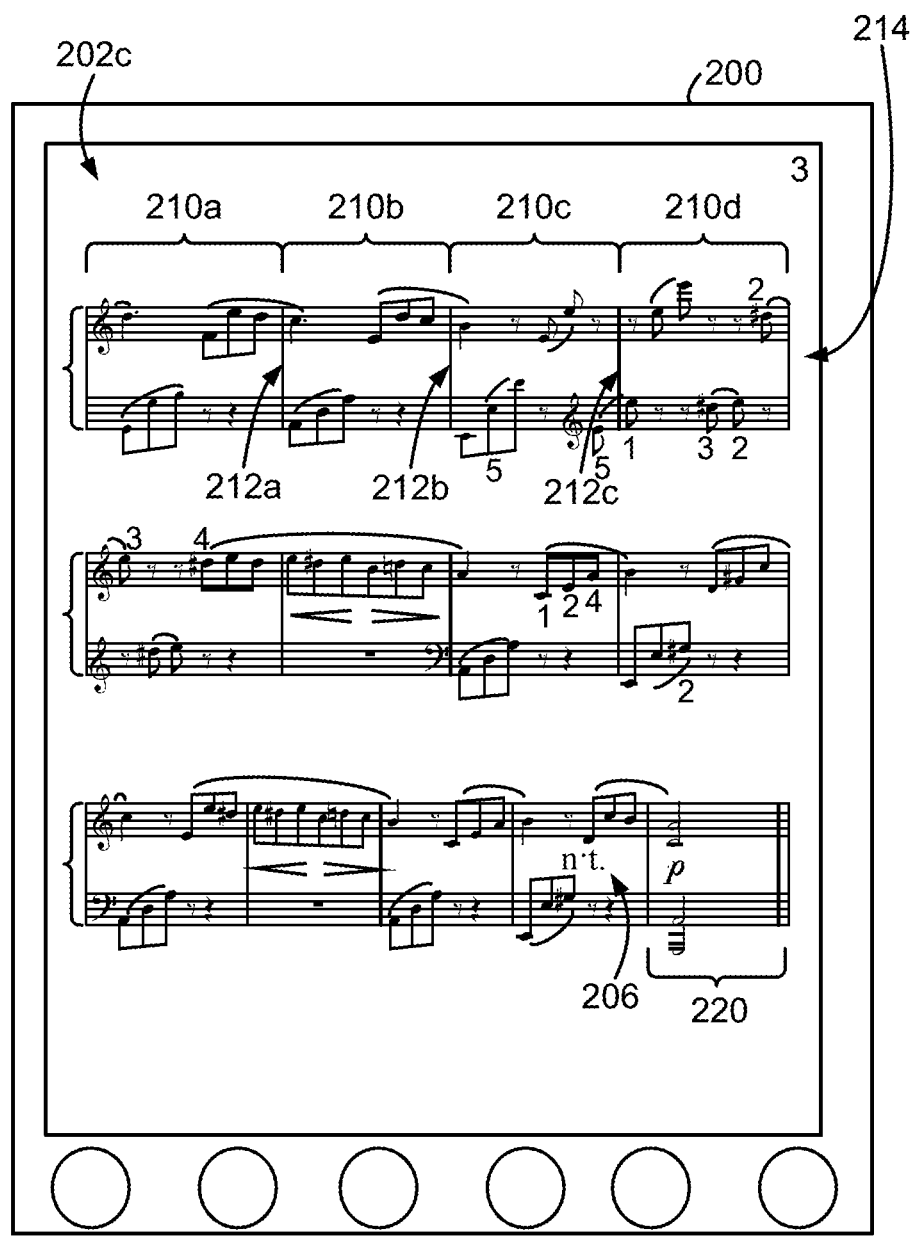

FIGS. 3a, 3b, and 3c are depictions of an example electronic device 200 that can be used to display sheet music for a musical composition. For example, electronic device 200 may correspond to the device 4 shown in FIG. 1, or the device 100 shown in FIGS. 2a-b. In FIG. 3a, the device 200 displays a first page 202a of the composition; in FIG. 3b, the device 200 displays a second page 202b of the composition; and in FIG. 3c, the device 200 displays a third page 202c of the composition. In various examples, the device 200 may synchronize display of the sheet music with a musical performance of the work. For example, the device 200 may display the first page 202a, as shown in FIG. 3a, while a first portion of the work is being played, may display the second page 202b, as shown in FIG. 3b, while a second portion of the work is being played, and may display the third page 202c, as shown in FIG. 3c, while a third portion of the work is being played.

The title of the musical composition in the example of FIGS. 3a-c is "Fur Elise," and the composer of the work is "Beethoven," as can be seen on the first page 202a. The musical composition includes a tempo descriptor 204 near a beginning of the first page 202a of the musical composition. In this example, the tempo descriptor 204 reads "Poco moto," which means "a little motion," and may indicate that the composition should not be played too briskly.

Generally, "tempo" may refer to a speed or pace at which a musical composition or portion of the musical composition may be played. A tempo indicator or tempo descriptor may provide a suggestion of an appropriate tempo for the musical composition. In general, a tempo indicator or tempo descriptor are examples of timing information that may be associated with a musical composition. Tempo may be indicated in a variety of ways, and may be indicated with various levels of specificity. For example, some musical compositions may include a specific indicator of tempo, and other compositions may include a tempo descriptor that suggests a general indication of tempo but does not include a precise indication. Still other compositions may not include an indication of tempo.

One way to specify a tempo is to indicate a number of "beats" over a particular time interval, where a beat is a basic time unit for music, as will be discussed further below. For example, a typical way to indicate, or to measure, tempo is in beats per minute ("bpm"). A beat-per-minute tempo indicator may appear in the musical work as, for example, "100 BPM," "100 bpm," or "♪=100," for an example where one hundred beats-per-minute is the recommended tempo. In other examples, the tempo may be specified as a number of musical beats, for example "100," without explicitly specifying the time period over which the beats should occur or even otherwise indicating that the number refers to a number of beats. In these cases, it may be assumed that the specified number refers to a number of beats per minute, for example. In other examples, a tempo may be specified as a time duration over which the entire musical composition should be played, or a time duration over which a portion (e.g., a measure, described below) of the musical composition should be played. Each of these "beats-per-time" conventions may specify a suggested tempo in a relatively precise fashion.

The musical composition in the example of FIGS. 3a-c provides another example of an indication of tempo within sheet music. Tempo descriptor 204 provides a general indication of tempo—"a little motion," in this example—but does not provide a specific beats-per-time tempo. Such a tempo descriptor that is less precise or specific may leave room for interpretation on the part of a musician or conductor, while still providing a general indication of a suggested tempo. For example, upon reading the tempo descriptor 204, a first musician may play the musical composition at about 80 bpm, a second musician may play at about 90 bpm, a third musician may play at about 100 bpm, and a fourth musician may play at some other tempo.

There are many different tempo descriptors or timing information indicators that can be used. For example, "Presto" to indicate a very fast tempo (e.g., about 168-180 bpm), "Allegro" to indicate a fast or bright tempo (e.g., about 120-167 bpm), "Moderato," to indicate a moderate tempo (e.g., about 108-119 bpm), "Andante" to indicate a walking pace tempo (e.g., about 76-107 bpm), "Adagio" to indicate a slow and stately tempo (e.g., about 66-75 bpm), "Largetto" to indicate a rather broad tempo (e.g., about 60-65 bpm), and "Largo," to indicate a very slow tempo (e.g., about 40-60 bpm), to list just a few examples. In various examples, these and other tempo indicators may be modified with words or phrases that qualify the tempo descriptor and provide additional information. In other examples, such as the example of FIGS. 2a-b, the musical work may not include an indicator of tempo.

Tempo can be used to affect the feel of the music, and a piece that is played at a first tempo may generally sound much different than the same piece played at a second tempo that is slower or faster than the first tempo. For this reason, composers frequently provide an indication of tempo within the sheet music to convey a desired tempo, tempo range, or description for their musical work.

In some examples, a composer may intend that different portions of a musical composition have different tempos, and may include one or more indicators of timing information, such as additional tempo indicators or descriptors for those portions in the sheet music. In some cases, tempo indicators later in a musical piece can be used to specify a new tempo or to modify an original or earlier tempo. In various examples, such later tempo indicators may specify a new tempo without regard to a previously specified tempo, or may specify a modification of an earlier tempo. A second tempo indicator 206, near the end of the composition on the third page 202c, reads "rit." and stands for "Ritardando," which means "immediately slow down." Other examples of tempo indicators that can modify a previously specified tempo include "accel.," which stands for "Accelerando" and means "speed up," "Stringendo," which means "press on faster," and "rall.," which stands for "Rallentando" and means "gradually slow down." Another tempo indicator 208, on the second page 202b, indicates a change in tempo from the original tempo 204.

As described above, a beat is a basic time unit for music, and can be used as a way of counting time when playing a piece of music. Beats give music a rhythmic pattern, and may be considered to define an underlying pulse for the music. A composer may determine both an appropriate tempo and an appropriate beat structure for a musical work while composing the work, and may include notation in the sheet music to indicate these choices. Some musicians may use a metronome configured to produce an audible pulse at a desired tempo while playing a musical work, and may play the musical work such that the beats of the music coincide with the metronome pulses. Other musicians may not use a metronome, and may prefer to mentally track the beats of the music while playing the musical work. A conductor leading a band or orchestra may move her arms in a rhythmic pattern that may convey beats of the music to performers in the band or orchestra.

In some examples, the device 200 may display or produce an indication of the beat while the music is being played. For example, a visual (e.g., on the display screen) or audible (e.g., via a speaker) indication of the beat may be provided. In some examples, the device may highlight the musical notes or rests of the composition, and may do so in synchronization with the playing of the music. This may aid the performer in keeping time with the music. In some examples, the device 200 may indicate a "start" signal to covey that play should begin. In some examples, the device may sense play beginning (e.g., via a microphone), and may synchronize display of the music with the performance. In some examples, an input to the device (e.g., a button 104 press, tap of touch screen, or other haptic input) may indicate that play is beginning.

A "measure" is a sheet music convention that can be used to define a segment of music over which a predetermined number of musical beats occur. With reference to the third page 202c, a first measure 210a, second measure 210b, third measure 210c, and fourth measure 210d are shown. Measures may be separated by vertical bars, and a first bar 212a separates measures 210a and 210b, a second bar 212b separates measures 210b and 210c, and a third bar 212c separates measures 210c and 210d. For example, each of measures 210a-d (and other measures of the depicted musical work) defines a segment of music that corresponds to a common number of musical beats. Measures and bars are here described with respect to a first line 214 of the third page 202c, but as can be seen in FIGS. 3a-c, the musical work is segmented into measures, separated by bars, throughout the work.

The depicted musical composition also includes time signature indicators 216. A time signature 216 is a musical notation that may indicate a number of beats per measure of the musical composition. The time signature 216 may also indicate a type of musical note that is associated with a single beat for the composition. Time signatures typically appear in a musical work as two numbers, one on top of the other. The top number may indicate a number of beats per measure, and the bottom number may indicate that a particular type of musical note is to be associated with a single musical beat for the composition.

In this example, the time signature is "3/4," as indicated by the time signature indicators 216. The upper number ("3" in this example) indicates that there are three beats per measure. Generally in this example, measures (e.g., measures 210a-d) of the musical work may define a musical segment over which three beats occur. Musical notes or musical rests within each measure may be played or observed by a musician over a time period corresponding to three beats. In other examples, the time signature may indicate two, four, five, six, seven, eight, nine, or some other number of beats per measure. The lower number of the time signature ("4" in this example) indicates that a "quarter note" is associated with one musical beat.

Time signature 216 is an example of a "simple" time signature (others include 2/4 or 4/4), but compound (e.g., 9/8, 12/8), mixed (e.g., 5/8, 3/8, 6/8), additive, fractional, irrational or other types of time signatures can alternatively be used. Just as tempo indicators can appear at the beginning of a piece and at intermediate points throughout the piece, one or more new time signatures may be used to change a time signature (e.g., number of beats per measure or type of note associated with one beat, or both) at one or more interim points of the piece.

As described above, each measure of a musical work ordinarily may be associated with a common number of musical beats, typically as indicated by a top number of a time signature. Each such measure may include one or more musical notes or musical rests that collectively correspond to the common number of musical beats. An exception to this general rule is illustrated in the depicted musical work, where a first measure 218 and a last measure 220 each include fewer than the common number of beats, but together include the common number of beats. For example, the first measure 218 includes musical notation that corresponds to one beat, and the last measure 220 includes musical notation that corresponds to two beats. When considered together, the first beat of the first measure 218 and the second and third beats of the last measure 220 sum to three beats, which represents the common number of beats per measure for the work. An initial measure that includes fewer than the time-signature-indicated number of beats, such as measure 218, may be referred to as a "pickup" measure.

Figure 4:
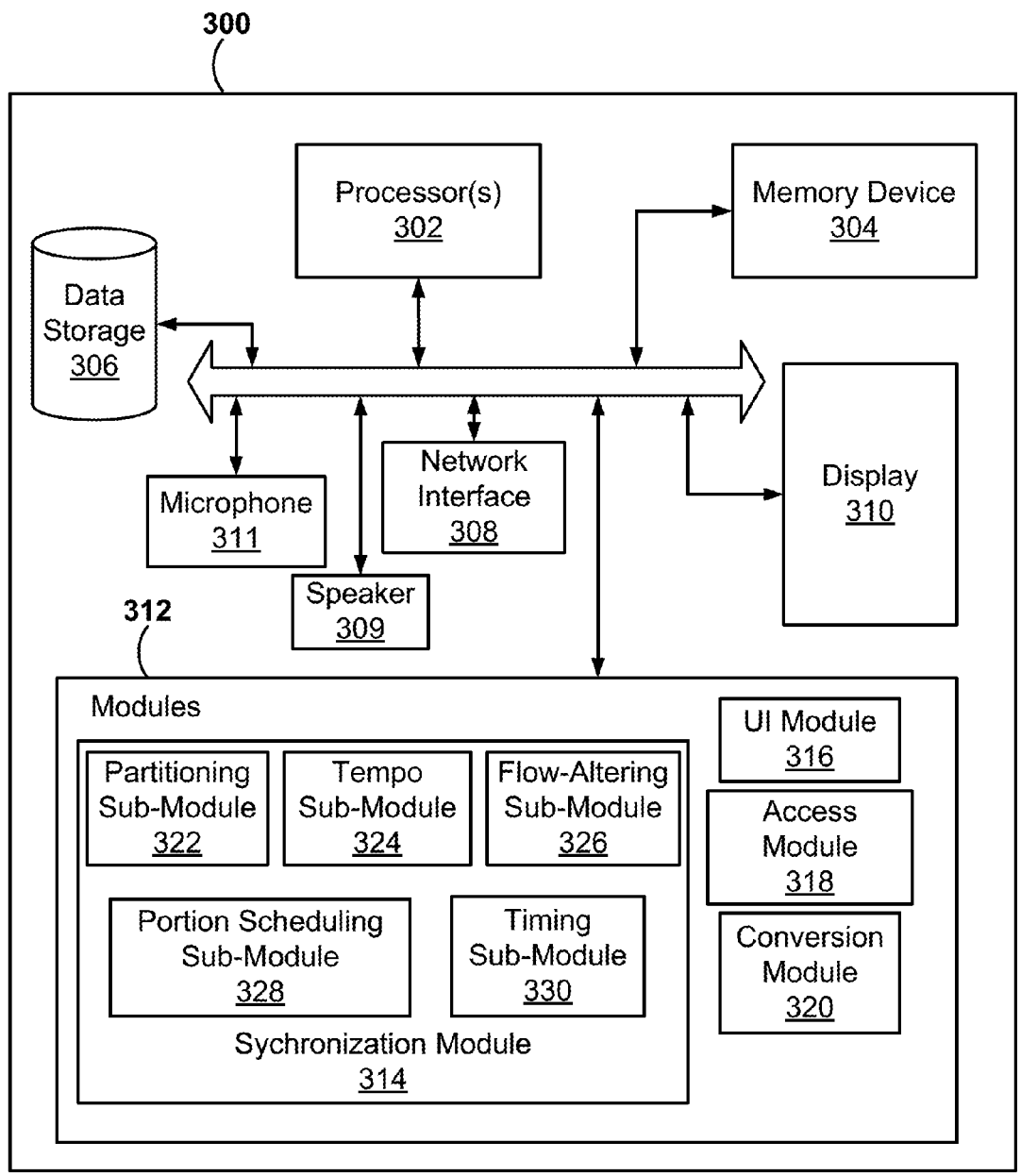
FIG. 4 is a depiction of an exemplary device that can be used to display sheet music.

FIG. 4 is a block diagram of an exemplary electronic device 300 that can be used to display sheet music for a musical composition. Device 300 may correspond to any of devices 4, 100, or 200, for example. The device 300 includes one or more processors 302, a memory device 304, and a data storage device 306. The discussion that follows will assume one processor 302, but some examples may include two or more processors. The processor 302 may implement or execute instructions to perform methods, processes, or techniques discussed herein. The processor 302 may be a microprocessor, a microcontroller, a digital signal processor (DSP), or one or more instantiated cores of an application specific integrated circuit (ASIC) or a programmable logic device, such as a field programmable gate array (FPGA), to list just a few examples. In some examples, memory device 304 may be a volatile memory device, and in other examples may be a non-volatile memory device. Data storage 306 may provide non-volatile storage for firmware, software, musical work files, data or parameters that can be used to aid in display of sheet music of musical works, interface data or parameters, access data or parameters, or other data or parameters that may be used to implement the techniques discussed herein.

In some examples, software, firmware, code comprising instructions or data may be loaded from data storage 306 to memory device 304, and may be executed or operated on by processor 302. In some examples, processor 302 may include on-chip memory, such as a cache, into which instructions or data may be loaded and operated upon.

A display 310 may be used to display information that may be viewed by a user. For example, the display 310 may be used to display sheet music, and in some examples may also be used to display text, icons, graphics, video or other visual representations to provide user interface output that a user may view. In various examples, display 310 may also be used for receipt of user interface input from a user. Display 310 may correspond to display 4, display 103, or the display shown in FIGS. 3a-c. In some examples, the display 310 may be an e-ink display screen. In some examples, the display 310 may be foldable. In some examples, the display 310 may be a flat panel display. In some examples, the display 310 may be a liquid crystal display (LCD). In some examples, the display 310 may be a touch screen, and the device 300 may be responsive to tactile inputs to the touch screen, including inputs made by hand or with a stylus, for example. In various examples, the display 310 may display sheet music in full color, or in black-and-white, monochrome, or gray scale. Display 310 may be of any appropriate physical size. For example, display 310 may be sized for a mobile phone or a smart phone, for a tablet PC, for a large e-ink display (e.g., 8.5"×11"), or for larger displays, such as for televisions, or even for projection screens.

Device 300, and display 310, may be sized differently for different applications. For example, the device 300 and the display 310 may have a relatively small form factor (e.g., about the size of a mobile phone or a personal digital assistant (PDA)) for applications where increased size may be an inconvenience. One such application may be for members of a marching band or a pep band, where the device may be mounted to an instrument, for example. In other cases, the device 300 and the display 310 may have a somewhat larger size, and may be sized to fit on a music stand, for example (e.g., see discussion below with respect to FIGS. 5a-c). In some examples, the device 300 and the display 310 may be integrated with a musical instrument. For example, the device 300 and display 310 may be inset in a piano.

A network interface 308 can be used, for example, to communicably couple electronic device 300 with other computing devices over a network, such as network 6. For example, network interface 308 may be used to when the electronic device 300 communicates with the music vendor 8, the music repository 10, one or more other electronic devices 300, a PDA, a mobile phone, a smart phone, a handheld music player (e.g., an MP-3 player), or some other type of computing device over network 6. In addition to the types of networks discussed above, network interface 308 may also be used to facilitate communications between device 300 and one or more other computing devices over a Bluetooth network, or the like. Network interface 308 may include one or more interface ports to provide interface connectivity with other devices. Examples of ports can include universal serial bus (USB) ports, Ethernet ports, serial or parallel communication ports, compact disc (CD) or digital versatile disc (DVD) drives, firewire ports, or other data ports.

A speaker 309 may be used to provide audible output. For example, the speaker 309 may provide an audible indication of a beat for music that is displayed on display 310. A microphone 311 may be used to receive audible input. For example, the microphone 311 may be used to sense a beginning of play of music displayed on display 310. In some examples, the microphone can be used to sense notes of displayed sheet music that are being played by a musician.

Device 300 also includes a group of modules 312, including a synchronization module 314, a user interface (UI) module 316, an access module 318, and a conversion module 320. Synchronization module 314 may correspond to the synchronization module 14 shown in FIG. 1, for example. Synchronization module 314 can be used to synchronize display of one or more portions of sheet music for a musical composition with a performance of the musical composition, and in some examples includes a partitioning sub-module 322, a tempo sub-module 324, a flow-altering sub-module 326, a portion scheduling sub-module 328, and a timing sub-module 330.

In various examples, any of the modules or sub-modules in the group of modules 312 may be implemented in or be operable to be executed by the processor 302. In some examples, one or more of the modules or sub-modules may comprise hardware, software, firmware, or a combination of the foregoing. In some examples, one or more of the modules or sub-modules, or a portion thereof, may be implemented within processor 302. In some examples, the modules and/or sub-modules may reside in data storage 306 or in memory device 304. In various examples, the modules or sub-modules may be combined or separated in various fashions, and additional or fewer modules or sub-modules may be used. Although the modules 312 are shown coupled to a bus in FIG. 4, in various examples the modules 312 could be implemented in various different ways.

The partitioning sub-module 322 may be used to partition sheet music for a musical work into two or more portions of sheet music. The partitioning sub-module 322 may provide the portion scheduling sub-module 328 with information relating to the sheet music partitions, which may be used in scheduling sheet music for display. For example, the two or more portions of sheet music may be displayed on the display 310 at appropriate times.

The partitioning sub-module 322 may consider several factors and may determine an appropriate partition schedule for a musical work. Examples of such factors can include length of the musical work, complexity of the musical work or of one or more portions of the musical work, display 310 size, music tempo, music time signature, or locations of flow-altering indicia or tempo indicators or descriptors within the sheet music. In some examples, partitioning sub-module 322 may receive tempo and time signature information from the tempo sub-module, and may receive flow-altering indicia information from the flow-altering sub-module 326, and may use this information in determining an appropriate partition of the musical work into portions.

Other factors that can influence a partition schedule can include user preferences, such as a preference for a particular number of musical staffs or lines for display at one time on the display 310, or for a preferred magnification ratio or displayed size of the music on the display 310. Some users may prefer to view an entire page, or two or more pages, of sheet music while playing the music, for example, while other users may prefer to view less than an entire page of sheet music while playing the music. Some users may prefer to view enlarged versions of the sheet music, for example if they have diminished eyesight or if the display 310 size is relatively small for a particular application (for example, for an application where the display device 300 is mounted on a trumpet or other instrument for a marching band performance).

In some examples, the device 300 may operate in one of a plurality of display modes. For example, the device 300 may operate in a first mode and display one full page of music.

Alternatively, the device 300 may operate in a second mode and display less than one page of music. Stated another way, in the first mode, the partitioning sub-module 322 may partition the sheet music into portions of music where each portion includes an entire page of the sheet music. In the second mode, the partitioning sub-module 322 may partition the sheet music into portions of music where each portion includes less than an entire page of the sheet music. Other display modes, such as a third mode where the device may display two pages of music concurrently—that is, where the partitioning sub-module 322 may partition the sheet music into portions that include two pages of sheet music—can also be used.

In some examples, the device 300 may operate in a mode where music associated with two or more instruments is concurrently displayed. In an example where two musicians are performing a duet (e.g., playing the same or different instrument types), each musician's device 300 may display sheet music for one or both of the instruments. This concept of displaying a primary portion of music, and one or more secondary portions of music (e.g., corresponding to another musician's piece), can be extended to trios, quartets, or even to an entire orchestra, for example. Display of the various portions may be synchronized across a network, as will be discussed in more detail below with respect to FIG. 6.

The tempo sub-module 324 may be used to identify tempo indicators (e.g., "120 bpm," or "♪=120,") or tempo descriptors (e.g., tempo descriptors 204, 206, 208 or any of the tempo descriptors discussed above with reference to FIG. 3, and others as known in the musical art) within the sheet music. The tempo sub-module 324 may provide the portion scheduling sub-module 328 with tempo information, which may be used in scheduling sheet music for display. In some examples, the tempo sub-module 324 may access a database that includes beats-per-time data (e.g., a beats-per-minute value or range) stored in association with tempo descriptors (e.g., any of the tempo descriptors discussed above with reference to FIG. 3, or others known in the musical arts).

For example, the tempo sub-module 324 may identify tempo descriptor 204 in the musical work depicted in FIG. 3*a*, and may access a table or database where a beats-per-time value (e.g., 90 bpm) is associated with tempo descriptor 204 to obtain the value. The device 300 may then use the value to synchronize display of the music with a performance of the music. As another example, the tempo sub-module may identify an "allegro" tempo descriptor in sheet music and access a table or database to obtain a value (e.g., 130 bpm) associated with a database entry corresponding to an "allegro" tempo. The database may be stored in data storage 306, for example.

The tempo sub-module 324 may also identify one or more time signatures, such as time signature 216, in the musical work. The tempo sub-module 324 may provide information from the time signature, such as a number of beats-per-measure or a type of note that specifies a single beat, to the timing sub-module 330. In some cases, the tempo sub-module 324 may access a database or table to retrieve information pertaining to the identified time signature, and may provide this information to the timing sub-module 330.

The tempo sub-module 324 may determine or derive a timing parameter for the musical composition, and may provide the timing parameter to the timing sub-module 330. The tempo sub-module 324 may receive a first electronic input, which may indicate timing information for the musical composition. For example, the first input may indicate a number of musical beats. In some examples, the input may further indicate a time length over which the number of musical beats is to span. The input may be a beats-per-time indicator. In some examples, the input may be a tempo indicator or tempo descriptor, as described above, and may be received, for example, by identifying the tempo indicator or tempo descriptor in the sheet music. Alternatively, the input may be received via a user interface, such as via buttons 104, for example.

In some examples, the timing parameter may indicate a time-per-musical beat for the musical composition. Deriving the timing parameter may include dividing a time period by a number of musical beats. For example, if the input specifies 100 beats, or 100 beats-per-minute, the timing parameter may indicate a time-per-musical beat of 0.01 minutes (i.e., 0.6 seconds).

In other examples, the timing parameter may indicate a time-per-measure for the musical composition. Deriving the timing parameter may include dividing a time period by a number of musical beats, and multiplying the result by a number of beats per measure. For example, if the input specifies 100 beats, or 100 beats-per-minute, and if the time signature indicates three beats per measure, the timing parameter may indicate a time-per-measure beat of 0.03 minutes (i.e., 1.8 seconds).

The flow-altering sub-module 326 may be used to identify flow-altering indicia, such as repeat signs 114, 120, first ending indicator 116, second ending indicator 118, other types of repeat signs (e.g., opposite-facing repeat signs), coda indicators, or other types of order-changing symbols, words, phrases, or the like that may appear in sheet music. As described above, flow-altering indicia may be any symbol, letter, word, or phrase that indicates a deviation from the normal left-to-right and top-to-bottom flow of sheet music. The flow-altering sub-module 326 may provide the portion scheduling sub-module 328 with flow-altering information, which may be used in scheduling sheet music for display. An example of information that can be provided may include where the flow-altering indicia are found in the sheet music.

The portion scheduling sub-module 328 may receive and/or process input from one or more of the partitioning sub-module 322 and the flow-altering sub-module 326 and may determine a display schedule for the portions of sheet music. For example, the portion scheduling sub-module 328 may determine an ordering that the various sheet music portions may be displayed on display 310. As one example, if there are no flow-altering indicia in the musical work, the ordering may call for contiguous portions of the sheet music to be display successively (e.g., first portion, second portion, third portion, . . . , where each succeeding portion is contiguous with the portion just previously displayed).

In other examples, an ordering may call for a second portion to be displayed following a first portion, where the second portion is not contiguous with the first portion. In some examples, the second portion may precede the first portion in the musical work (for example, if the second portion is an earlier portion that is now being repeated). In some examples, the second portion may also come later than the first portion in the musical work (for example, if the second portion is being skipped ahead to).

The timing sub-module 330 may determine one or more time durations that may be associated with a portion of a musical work. In some examples, for each portion of the musical work identified by the partitioning sub-module 322, the timing sub-module 330 may determine a time duration associated with the respective portion. In some examples, the timing sub-module 330 may determine a time duration for a portion that corresponds to a duration that the portion should be displayed. The timing sub-module 330 may use information received from the tempo sub-module 324, such as a timing parameter derived by the tempo sub-module 324 and described above.

In some examples, the timing sub-module 330 may determine the time duration for a portion by multiplying a time-per-musical-beat for the musical composition by a number of musical beats associated with the portion. In some examples, the timing sub-module 330 may determine the time duration for a portion by multiplying a time-per-measure for the musical composition by a number of measures associated with the portion.

In some examples, the timing sub-module 330 may be used as one or more timers to measure a time corresponding to one or more time durations associated with a musical work or with portions of the musical work. The timer may be started to measure time from a beginning of a portion of sheet music. The timing sub-module 330 may provide a signal following an expiration of the time duration, and the device 300 may update the display 310 to show a next portion of sheet music. For example, the device may display the next scheduled portion defined by the portion scheduling sub-module 328.

In some examples, the timing sub-module 330 may be used to track a position within a portion of displayed sheet music while the sheet music is being performed. For example, the device 300 may display an indicator of position within the displayed portion of sheet music on the display 310. As one example, corresponding notes or rests may be highlighted or otherwise referenced to coincide with the performance of the work. As another example, an indicator (e.g., a line or arrow) below or above a current position in the displayed music may be provided.

The UI module 316 may be used to implement a user interface. For example, the UI module 316 may receive input signals from one or more input devices. Examples of input devices may include the input buttons 104 shown in FIGS. 2*a-b* or FIGS. 3*a-c*. In other examples, the device 300 may include a full keyboard, and the UI module may interpret signals received from the keyboard. In some examples, the UI module 316 may interpret input received via a touch screen, as described above, or via a microphone. In some cases, UI module 316 may receive input that specifies or indicates timing information for the musical composition. In some examples, UI module 316 may be used to receive user input such as comments, notes, reminders, or the like. For example, a user may use a stylus to write a comment on a touch screen display of the device, and the UI module may interpret the comment. The UI module 316 may include handwriting recognition capability in some examples. In some examples, received notes or comments may be transmitted to other electronic devices, and the notes or comments may be displayed on the other electronic devices, as will be discussed below with reference to FIG. 6.

The access module 318 may be used to access and acquire musical works, such as from the music vendor 308 or the music repository 310. In some examples, the electronic device 300 may include one or more communication ports, such as a universal serial bus (USB) port, a port for receiving a memory card or a flash memory card (e.g., a compact flash card, a secure digital (SD), miniSD, or microSD memory card, a compact disk drive, a firewire port, or other type of communication port, and the access module 318 may be used to interface to the one or more ports. In some examples, a user may upload sheet music to the electronic device 300, and the music may be stored and displayed on the device.

The conversion module 320 may be used to convert between file types for musical works. Examples of file formats that musical works or sheet music for the musical works can be stored in may include portable document format (PDF), tagged image file format (TIFF), text, document, and others. In some examples, the conversion module 320 may be able to take a sound file and convert it into a sheet music file. For example, the module 320 may take a MIDI, MP3, MP4, or other type of sound file and convert it to a sheet music file.

Figure 5A:
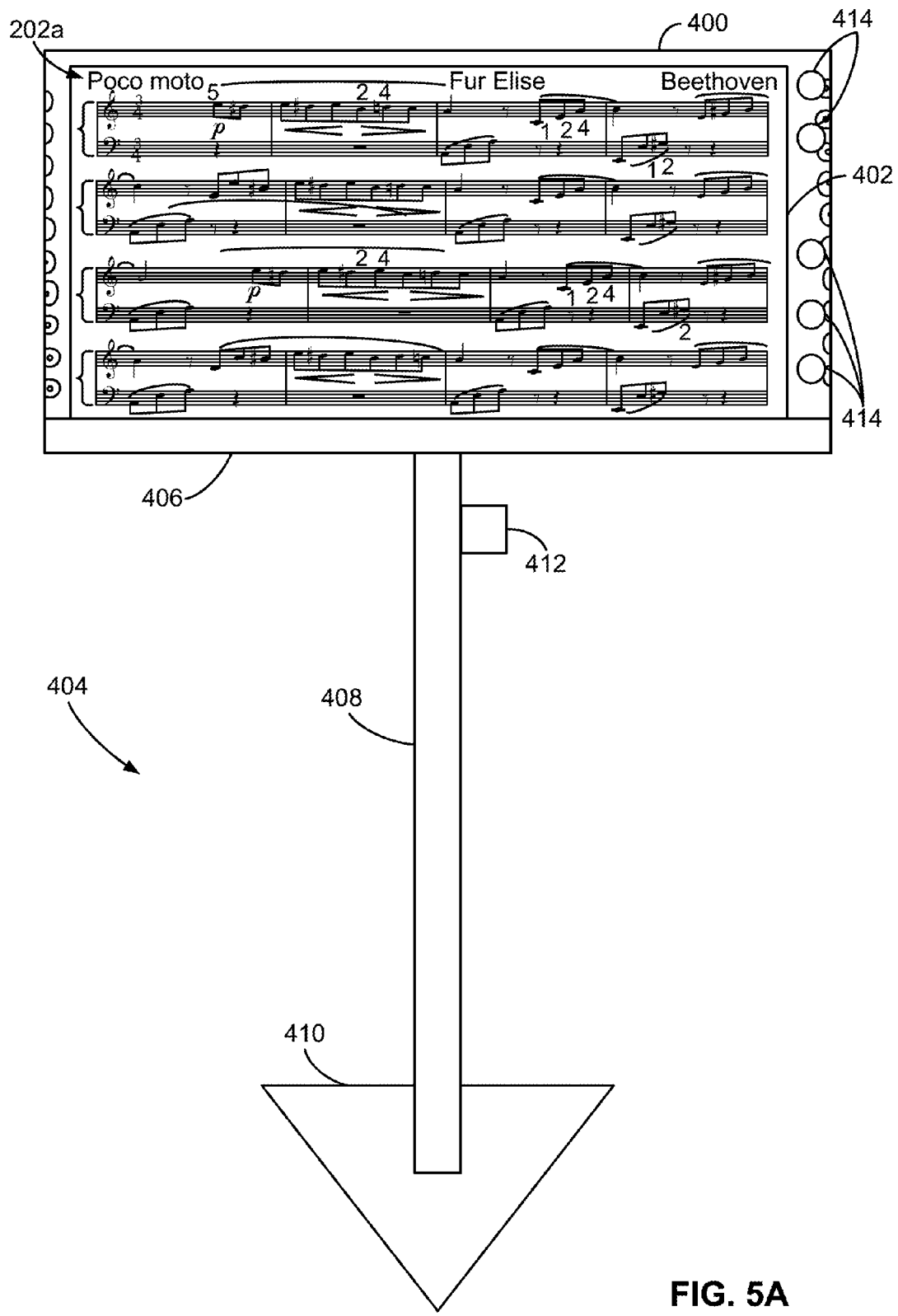
FIGS. 5a, 5b, and 5c are depictions of exemplary devices that can each be used to display sheet music.
Figure 5B:
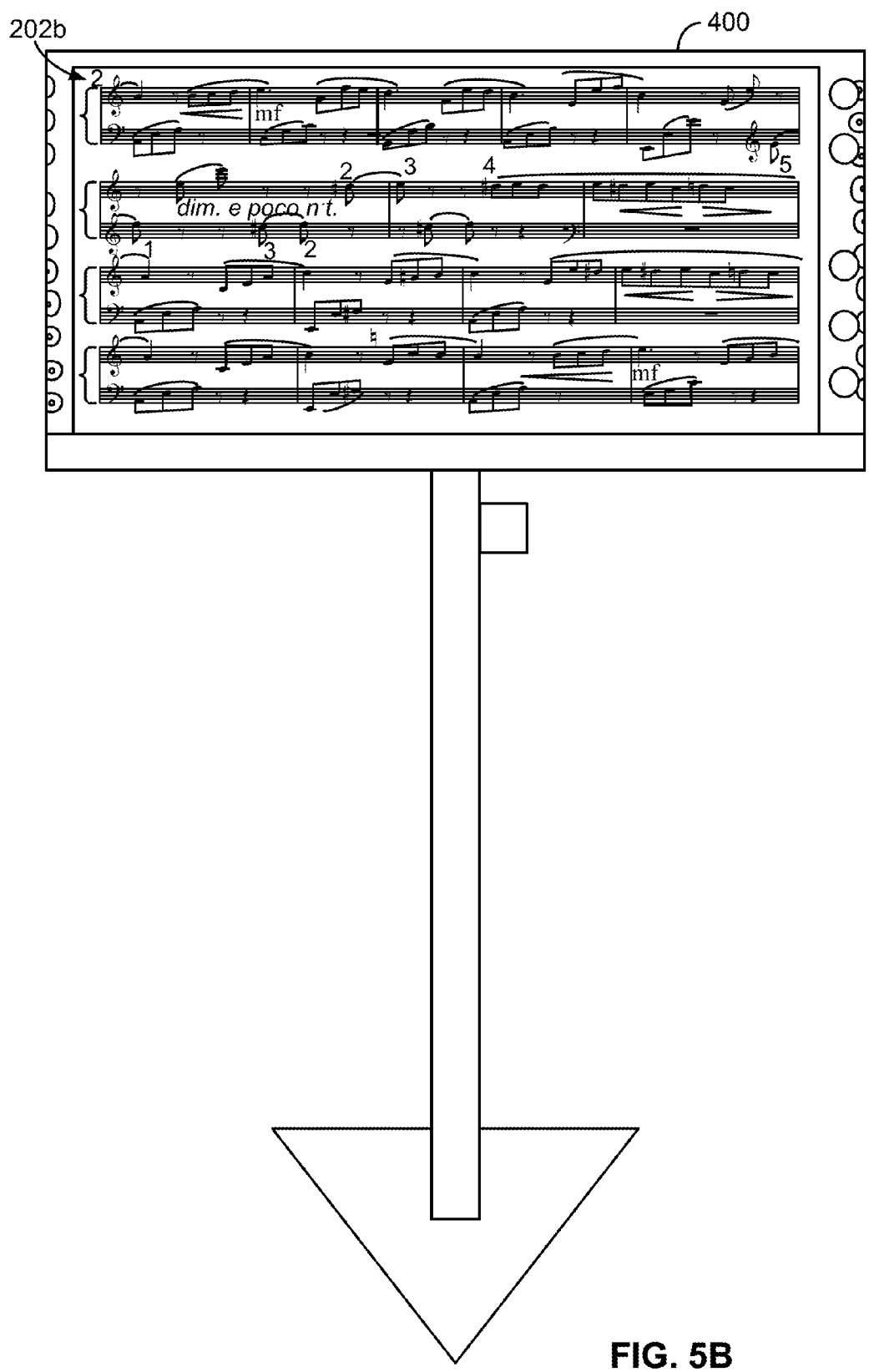
Figure 5C:
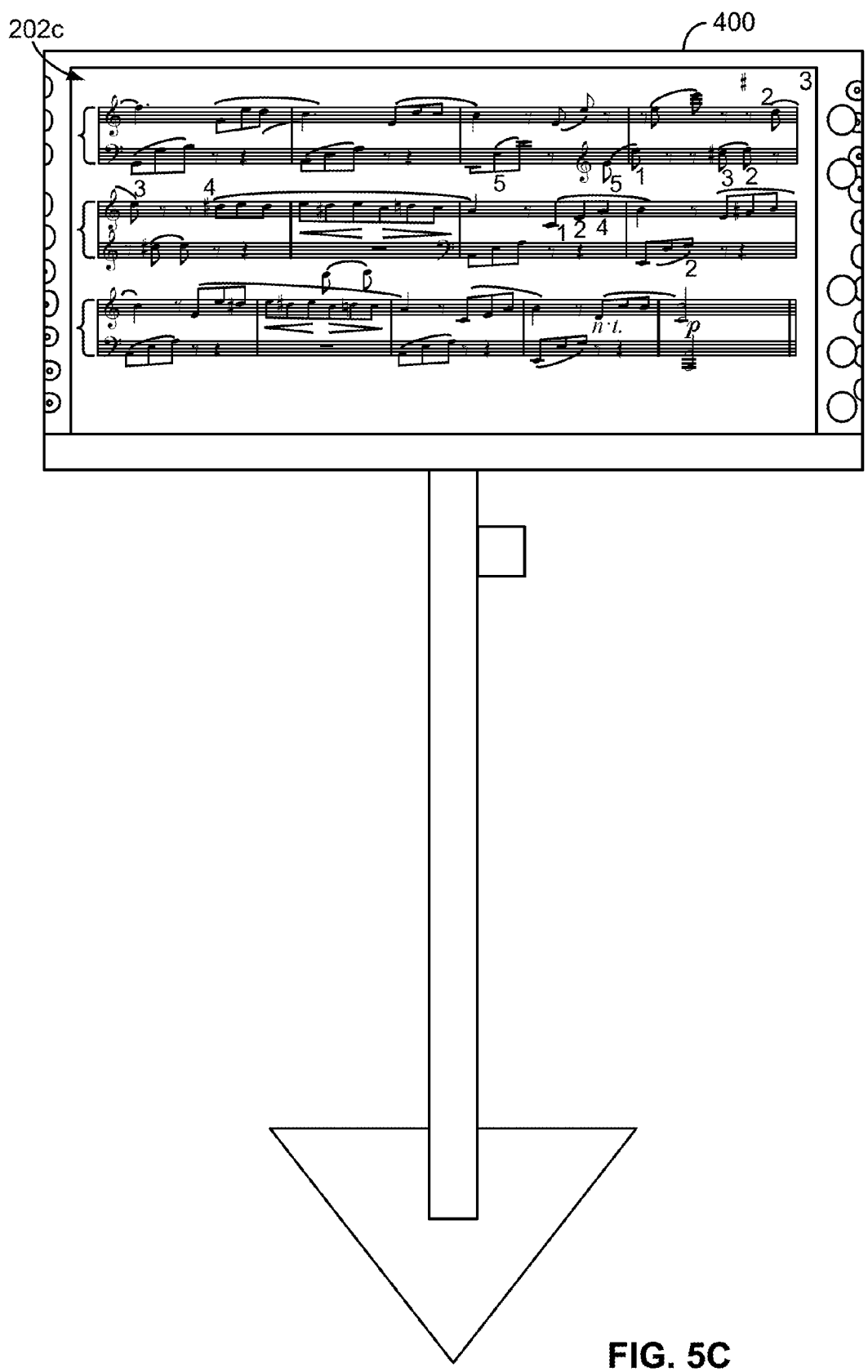

FIGS. 5*a*, 5*b*, and 5*c* are depictions of an exemplary device 400 that can be used to display sheet music. The device 400 may display sheet music on an electronic display screen 402 for a musical composition, and may correspond to any of devices 4, 100, 200, or 300. In various examples, the device 400 may display one or more portions of the musical composition, and may display the portions to coincide with a performance of the musical work. In FIG. 5*a*, the device 400 is displaying the first page 202*a* of the musical composition shown in FIGS. 3*a-c* and described above. In FIG. 5*b*, the device 400 is displaying the second page 202*b* of the musical composition, and in FIG. 5*c*, the device 400 is displaying the third page 202*c* of the musical composition.

As can be seen in FIGS. 5*a-c*, the exemplary device 400 has a larger form factor than the devices shown in FIGS. 2*a-b* or in FIGS. 3*a-c*. The device 400 may have a form factor that is adopted for music stands, for example. Device 400 includes a display screen 402, on which sheet music may be displayed. Buttons 414 may be used to provide input in some examples.

A music stand 404 includes a support member 406, a pedestal 404 attached at a first end to the support member 404, and a base 406 attached to an opposite end of the pedestal 404. In some examples, the device 400 and the music stand 404 may be integrated as a single unit. In other examples, the device 400 and the music stand 404 may not be integrated, and the device 400 may be placed on the support member 406. In some examples, a height of the stand 404 may adjustable, as by loosening an adjustment knob 412, lengthening or shortening a portion of the pedestal 404, and tightening the adjustment knob 412.

Device 400 may be sized for various applications. For example, the device 400 in FIGS. 5*a-c* has a form factor that may permit it to display multiple pages of music concurrently. In the depicted examples, a single sheet is shown. As described above, the partitioning sub-module 322 may determine an appropriate portion size and number of portions for the musical work, where screen size may be one factor in making the determination.

FIG. 6 is block diagram of an exemplary system 500 that includes a plurality of communicably coupled music devices 502*a*, 502*b*, 502*c*, 502*d*, 502*e*, 502*f*, 502*g*. The devices may communicate with one another over a network 504, for example. The music devices 502*a*, 502*b*, 502*c*, 502*d*, 502*e*, 502*f*, 502*g* may correspond to any of devices 4, 100, 200, 300, or 400, for example, and network 504 may correspond to network 6. In this example, device 502*a* may be used by a conductor of a band or an orchestra, and devices 502*b*, 502*c*, 502*d*, 502*e*, 502*f*, and 502*g* may be used by instrument-playing members of the band or orchestra. For example, device 502*b* may be used by a trombone player, device 502*c* may be used by a saxophone player, device 502*d* may be used by a trumpet player, device 502*e* may be used by a percussion player, device 502*f* may be used by a clarinet player, and device 502*g* may be used by a flute player. In a typical orchestra, of course, there would be many more devices 502, but for simplicity a reduced number of devices 502 are shown in FIG. 6. Any of the devices 502*a-g* may correspond to any of devices 4, 100, 200, 300, or 400, for example.

Music display device 502*a* may display the conductor's score, or master sheet music 508 on a display 506*a* of the device 502*a*. Music display device 502*b* may display sheet music 510 for a first instrument (e.g., a trombone) on a display 506b of the device 502b. Music display device 502c may display sheet music 512 for a second instrument (e.g., a saxophone) on a display 506c of the device 502c. Music display device 502d may display sheet music 514 for a third instrument (e.g., a trumpet) on a display 506d of the device 502d. Music display device 502e may display sheet music 516 for a fourth instrument (e.g., percussion) on a display 506e of the device 502e. Music display device 502f may display sheet music 518 for a fifth instrument (e.g., a clarinet) on a display 506f of the device 502f. Music display device 502g may display sheet music 520 for a sixth instrument (e.g., a flute) on a display 506g of the device 502g.

In some examples, one of the music display devices 502 may send a message to one, some, or all of the other music display devices 502. For example, the conductor may provide an input to music display device 502a, and device 502a may send a message to each of music display devices 502b-g over network 504. Suppose that the orchestra is playing a musical work, and is approaching the final few measures of the work. The conductor may want to ask all of the orchestra members for a "big finish," which may indicate that the conductor wants the members to play with extra emotion over the final few measures. The conductor may provide one or more inputs to device 502a, such as by writing "BIG FINISH!" on a touch screen of device 502a with a stylus, and the device 502a may transmit a message to each of the other devices 502b-g over the network 504. The member devices 502b-g may each receive the message, and may display on their respective displays 506b-g the words "BIG FINISH!" In this fashion, the conductor may communicate messages to one or more members of the orchestra via the music display devices 502 in real time.

In some examples, one of the music display devices 502 may send a message to one, some, or all of the other music display devices 502 to synchronize the devices 502 in time. For example, a conductor's music display device 502a may send such a message to each of music display devices 502b-g over network 504. In one example, such a message may indicate a start of a performance, and each of the respective display devices 502 may begin timing with respect to the received message or start of the performance. In some aspects, one or more periodic synchronization messages may be sent during the performance. In other examples, such synchronization messages may not be used.

In other examples, the conductor may use device 502a to send a message to only one member of the orchestra (e.g., "Pay attention, Bill," "Not so eager, Sara," "More, Jake," "Slower" to Emily), or to members of one group of instruments (e.g., "More trombone," to all trombone-playing members of the orchestra). In some examples, the conductor may target a subset of a group of instruments. For example, the conductor may send a message to all third-chair trumpet players to reduce their volume of playing if they are overshadowing the first- and second-chair trumpets.

The messages may be displayed at the receiving devices 502b-g in various fashions. In one example, an area of the corresponding display 506b-g may be reserved for displaying messages, and the message may be displayed in the reserved area, such as for a predetermined period of time. In another example, the message may be displayed in a popup window, or the like, for a predetermined period of time. For example, the receiving device 502b-g may display the message on a portion of the corresponding display screen 506b-g that is unlikely to disrupt the musician yet still likely to convey the message. As one example, the message may appear on the display 506b-g above or below the portion of the sheet music currently being played.

Figure 7:
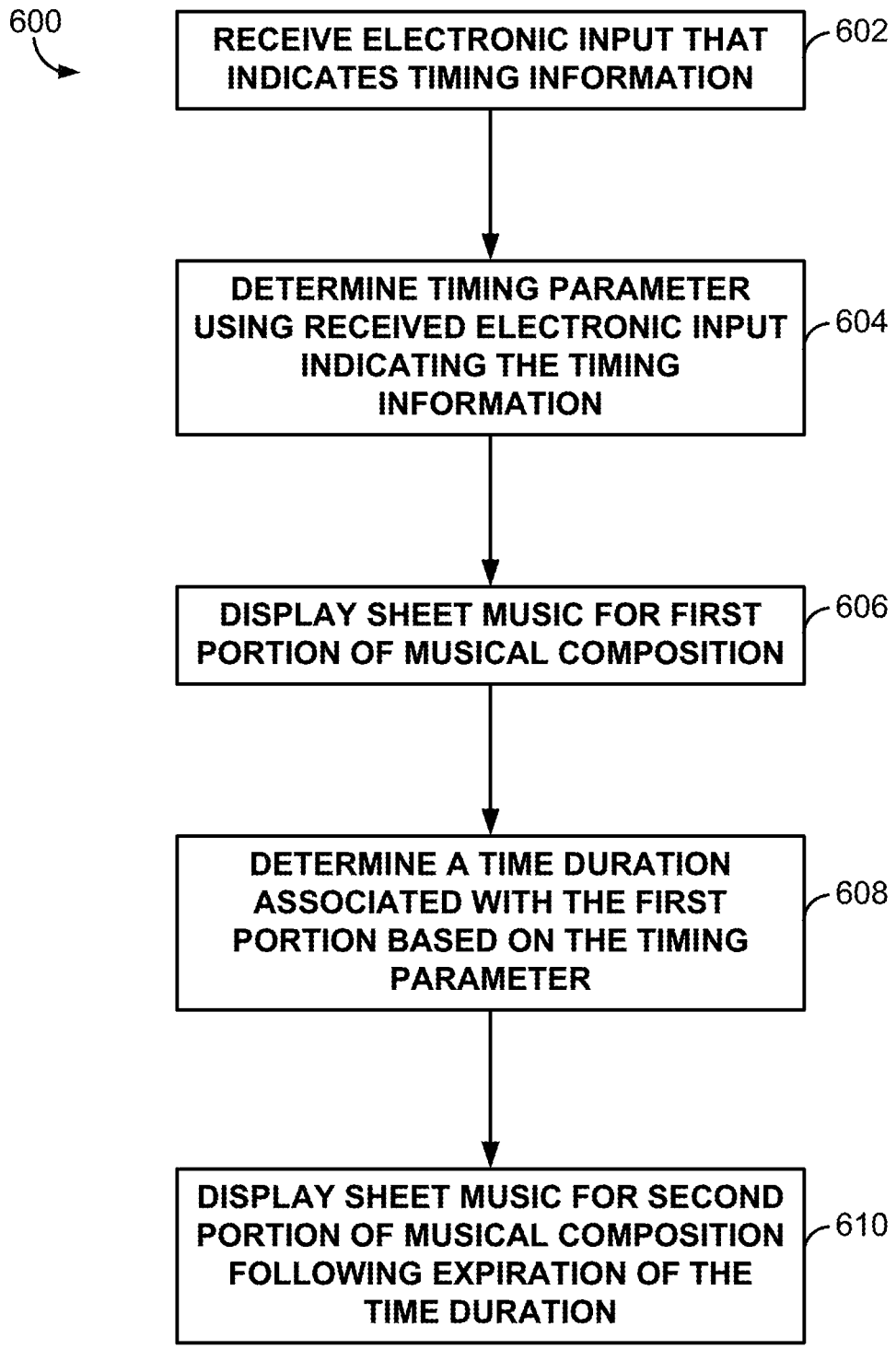
FIG. 7 is a flow diagram illustrating an example of a method that may be performed by an electronic device to display sheet music.

FIG. 7 is a flow diagram illustrating an example of a method 600 that may be performed by an electronic device to display sheet music. For example, the method 600 may be performed by any of devices 4, 100, 200, 300, 400, or 502a-g. An electronic input that indicates timing information is received (602). In some examples, the input that indicates timing information can be derived from character analysis or pattern recognition of a time signature or other timing information within the sheet music. The synchronization modules discussed herein may be configured to implement character analysis or pattern recognition, according to some aspects. In some examples, the electronic input may indicate a number of musical beats. The input may indicate, for example, a number of musical beats over a period of time, such as a number of beats per minute. The input may alternatively be a tempo descriptor that describes a tempo. Examples of tempo descriptors can include "Allegro," "Moderato," "Andante," "Andantino," or any of the many tempo descriptors known in the musical arts. Examples of other inputs that can indicate timing information include an input that indicates a time period, such as a period of time that the entire musical work or a portion (e.g., one measure) of the musical work may be played in.

In some examples the electronic input may be received from a user via a user interface of the device. In some examples the input may be received by identifying a tempo indicator or tempo descriptor in the sheet music. In some examples, receiving the input may include accessing, from an electronic storage location, an indicator of a predetermined number of musical beats associated with the tempo descriptor. For example, a database may be queried with an identified tempo descriptor and one or more values associated with the tempo descriptor may be returned.

A timing parameter may be determined using the received electronic input indicating the timing information (604). In some examples, the timing parameter may indicate a time-per-musical-beat for the musical composition. Determining the timing parameter can include dividing a time period by a number of musical beats. In some examples, the timing parameter can indicate a time per measure of the sheet music, and deriving the time parameter can include dividing a time period by a number of musical beats, and multiplying the result by a number of beats per measure.

In some examples, more than one timing parameter may be determined for a particular musical composition. This may occur, for example, when a musical composition includes two or more tempo indicators or tempo descriptors, which may indicate that different tempos are desired for different portions of the musical work. More than one timing parameter may also be determined, for example, when a time signature changes within a musical work.

Sheet music for a first portion of the musical composition may be displayed (606). In some examples, a musical work may be partitioned into two or more portions so that individual portions may be separately displayed on the device.

A time duration associated with the first portion may be determined based on the timing parameter (608). The device may use the derived timing parameter to determine a time duration for each of the partitioned portions for the musical composition. In cases where more than one timing parameter has been derived, as described above, determining the time duration for a particular portion may include using the appropriate one or more timing parameters for the particular portion.

In some examples, determining a time duration for a portion of sheet music may include using two or more timing parameters. For example, if a first timing parameter applies to a first section of a given portion, and a second timing parameter applies to a second section of the given portion, the first timing parameter may be used to determine a first sub-duration that corresponds to the first section of the portion, and the second timing parameter may be used to determine a second sub-duration that corresponds to the second section of the portion. The first and second sub-durations may be added in this example to determine a time duration for the portion. This example can be extended to any appropriate number of timing parameters (e.g., three, four, five, and so on) that may apply to a particular portion of the sheet music.

Sheet music for a second portion of the musical composition may be displayed following an expiration of the time duration for the first portion of the musical composition (610). A timer may be used to measure a time corresponding to the time duration associated with the first portion, and the time may be measured from a beginning of the first portion. For example, display of the sheet music for the musical composition may be synchronized with a performance of the musical composition (potentially across an orchestra), and displayed page updates from a first portion of sheet music to a second portion of sheet music on the device may occur at or near the time that the corresponding performance of the musical composition transitions from music represented by the first portion of sheet music to music represented by the second portion of sheet music.

In some examples, display of the sheet music for the first portion may be discontinued following the expiration of the time duration, so that only the sheet music for the second portion is displayed. In other examples, sheet music for the first portion may be continued to be displayed following the expiration of the time duration, so that sheet music for both the first portion and the second portion is displayed. In yet other examples, sheet music for a subset of the first portion (e.g., the last measure, the last two measures, or the last few measures of the portion) may be continued to be displayed following the expiration of the time duration, so that sheet music for both the first portion and the second portion is displayed. Continuing to display sheet music for the first portion or a subset of the first portion following the expiration of the time duration may promote a smooth transition between portions by allowing some display overlap of the portions, or subsets thereof.

In various aspects, the time duration for a given portion of sheet music may correspond to a time equal to, or shorter than, a time over which sheet music for the portion is designed to be played, for example according to timing information associated with the musical composition. In some examples, the time duration may correspond to a time over which the entire portion of sheet music is designed to be played. In other examples, the time duration may correspond to a time over which some subset of the portion of sheet music is designed to be played. As one example, the time duration may correspond to a time over which one measure of the portion is designed to be played. For example, the time duration may correspond to a time over which a last measure of the portion is designed to be played, and the time duration may be measured from a beginning of the last measure of the portion. As other examples, the time duration may correspond to a time to play the entire portion except for a predetermined number of notes, beats, or measures at or near the end of the portion. In yet other examples, the time duration can correspond to a time longer than a time over which sheet music for the portion is designed to be played.

In some examples, a setting may influence when the device updates the display during a transition between display of a first portion and a second portion of sheet music. For example, some users may prefer that the transition occurs immediately after the last note in the last measure is played. Other users may prefer that the transition occurs, for example, a predetermined number of beats (e.g., one-quarter beat, one-half beat, one beat, two beats, three beats, four beats, and so on) before the final beat of the portion.

In some examples, display transitions between portions of sheet music may be somewhat gradual. For example, at the expiration of the time duration or at some predetermined time before the expiration of the time duration, the displayed (e.g., first) portion of sheet music may move leftward, as if being scrolled to the right, and the portion to be displayed (e.g., second) may similarly move leftward and replace the first portion. Alternatively, display transitions between portions of sheet music may be relatively abrupt, and the second portion of sheet music may replace the first portion on the display at the expiration of the time duration or at some predetermined time before the expiration, as discussed above.

In some examples, more than one portion of sheet music may be displayed at the same time. For example, a first portion of sheet music may be displayed on a first area of the display, and a second portion of sheet music may concurrently be displayed on a second area of the display. In some examples, the device may highlight, border, emphasize, or otherwise indicate which of the displayed portions of sheet music is currently active or being played by the musician, or in some cases is about to be played. As one example, when a repeat symbol is encountered during play of a first portion, and the repeat symbol indicates that a section of music from an earlier portion of sheet music should be repeated, the earlier portion may be displayed together with the first portion on the display. In this example, the device may highlight, for example, the earlier portion while this portion is being played, which may be indicated by a timing function provided by the synchronization module 314. Display of the earlier portion may be discontinued when play returns to the first portion, for example.

In some examples, the second portion of the musical composition may be contiguous with the first portion of the musical composition. Stated another way, when the device updates the display and displays a second portion of sheet music following display of a first portion of sheet music, the second portion may follow directly from the first portion in the sheet music. In some examples, the second portion of the musical composition may not be contiguous with the first portion of the musical composition. That is, the second portion may not follow directly from the first portion within the sheet music for the musical composition, and may either represent a jump backward or a jump forward in the sheet music. In some examples, the second portion of sheet music may precede the first portion of sheet music within the musical composition. In some examples, the second portion of sheet music may come later than the first portion of sheet music within the musical composition, and there may be one or more other portions of sheet music within the musical composition between the first and second portions.

In some examples, a user may be able to alter the tempo during play. In some cases, this may be done in real time, and in other cases the user may provide an input that causes the device to pause. During the pause, the tempo may be adjusted, and play may resume at the new tempo. For example, when playing a piece for the first time, a musician may find it difficult to play at the suggested tempo, and may pause (e.g., by pressing one of the buttons 104) the device and provide an input that indicates a tempo that is slower than the suggested tempo. Play may then resume at the slower tempo from the point in the sheet music where play was paused, or in some cases may restart from the beginning with the slower tempo.

The techniques described in this disclosure may be implemented within one or more of a general purpose microprocessor, digital signal processor (DSP), application specific integrated circuit (ASIC), field programmable gate array (FPGA), programmable logic device (PLD), or other equivalent logic devices. Accordingly, the terms "processor" or "controller," as used herein, may refer to any one or more of the foregoing structures or any other structure suitable for example of the techniques described herein.

The various components illustrated herein may be realized by any suitable combination of hardware, software, or firmware. In the figures, various components are depicted as separate units or modules. However, all or several of the various components described with reference to these figures may be integrated into combined units or modules within common hardware, firmware, and/or software. Accordingly, the representation of features as components, units or modules is intended to highlight particular functional features for ease of illustration, and does not necessarily require realization of such features by separate hardware, firmware, or software components. In some cases, various units may be implemented as programmable processes performed by one or more processors.

Any features described herein as modules, devices, or components may be implemented together in an integrated logic device or separately as discrete but interoperable logic devices. In various aspects, such components may be formed at least in part as one or more integrated circuit devices, which may be referred to collectively as an integrated circuit device, such as an integrated circuit chip or chipset. Such circuitry may be provided in a single integrated circuit chip device or in multiple, interoperable integrated circuit chip devices, and may be used in any of a variety of image, display, audio, or other multi-multimedia applications and devices. In some aspects, for example, such components may form part of a mobile device, such as a wireless communication device handset (e.g., a mobile telephone handset).

If implemented in software, the techniques may be realized at least in part by a computer-readable data storage medium comprising code with instructions that, when executed by one or more processors, performs one or more of the methods described above. The computer-readable storage medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), embedded dynamic random access memory (eDRAM), static random access memory (SRAM), flash memory, magnetic or optical data storage media. Any software that is utilized may be executed by one or more processors, such as one or more DSP's, general purpose microprocessors, ASIC's, FPGA's, or other equivalent integrated or discrete logic circuitry.

Various aspects have been described in this disclosure. These and other aspects are within the scope of the following claims.

What is claimed is:

1. A method of displaying sheet music on a first electronic device, the method comprising:
   deriving a first electronic input that indicates timing information for a musical composition using character analysis or pattern recognition on sheet music for the musical composition, wherein the sheet music for the musical composition comprises one or more of: musical tempo words, tempo defining symbols, and flow-altering indicia;
   determining, using one or more processors of an electronic device, a timing parameter for the musical composition using the first electronic input indicating the timing information;
   partitioning the musical composition, using the one or more processors of the first electronic device, into a plurality of portions that define a different partitioning than an original form of the sheet music for the musical composition, comprising at least a first portion and a second portion, wherein the partitioning of the musical composition is based at least in part on the timing parameter for the musical composition, the complexity of the musical composition or of one or more portions of the musical composition, and a size of a display screen of the first electronic device;
   determining a time duration associated with the first portion based at least in part on the timing parameter for the musical composition and the partitioning of the musical composition;
   displaying, on the display screen of the electronic device, sheet music for the first portion of the plurality of portions of the musical composition; and
   displaying, on the display screen of the electronic device, sheet music for the second portion of the plurality of portions of the musical composition following an expiration of the time duration associated with the first portion.

2. The method of claim 1, wherein the first electronic input indicates a number of musical beats, wherein the number of musical beats is to be played over a length of time.

3. The method of claim 1, wherein the first electronic input indicates a tempo descriptor comprising a word, an abbreviation, or a phrase, and wherein the method further comprises accessing from an electronic storage location an indicator of a predetermined number or range of musical beats per unit of time associated with the tempo descriptor.

4. The method of claim 1, wherein the timing parameter indicates a time-per-musical-beat for the musical composition, and wherein determining the timing parameter comprises dividing a time period by a number of musical beats.

5. The method of claim 4, wherein determining the time duration for the first portion comprises multiplying the time-per-musical-beat for the musical composition by a number of musical beats associated with the first portion.

6. The method of claim 4, wherein the time duration for the first portion indicates a time duration of one measure of the musical composition, and wherein determining the time duration of the one measure of the musical composition comprises multiplying the time-per-musical-beat for the musical composition by a number of musical beats per measure of the musical composition.

7. The method of claim 1, further comprising displaying on the first electronic device an indicator of position within the portion of the musical composition displayed on the first electronic device.

8. The method of claim 1, wherein the second portion of the musical composition is contiguous with the first portion of the musical composition.

9. The method of claim 1, wherein the second portion of the musical composition is not contiguous with the first portion of the musical composition, and wherein the second portion precedes the first portion within the musical composition.

10. The method of claim 1, wherein the displaying of sheet music for the first portion is discontinued following the expiration of the time duration.

11. The method of claim 1, wherein the displaying of sheet music for a subset of the first portion is continued following the expiration of the time duration, with the first portion moving leftward, overlapping display of at least a subset of the sheet music for the second portion, as the second portion moves leftward and replaces the first portion.

12. The method of claim 1, further comprising:
receiving a second electronic input that indicates a comment related to the sheet music for the first portion; and
transmitting an electronic message for receipt by a second electronic device, wherein the electronic message instructs the second electronic device to display the comment related to the sheet music for the first portion.

13. The method of claim 1, further comprising transmitting an electronic message for receipt by a second electronic device, wherein the electronic message is used by the second electronic device to synchronize with the electronic device.

14. The method of claim 1, wherein the display screen of the first electronic device comprises an e-ink display screen.

15. The method of claim 1, wherein the display screen of the first electronic device comprises a foldable display.

16. The method of claim 1, wherein the first electronic device is integrated with a musical instrument, and the display screen of the first electronic device is inset in the musical instrument.

17. The method of claim 1, wherein the partitioning of the musical composition is further based at least in part on a length of the musical composition.

18. The method of claim 1, further comprising the first electronic device sensing a performance of the musical composition via a microphone, and the first electronic device synchronizing the displaying of the sheet music with the performance.

19. The method of claim 1, wherein the plurality of portions of the musical composition are directed to a first part intended for a first instrument, and the method further comprises displaying sheet music on a second electronic device for a second plurality of portions of the musical composition for a second part intended for a second instrument, and the method further comprises concurrently displaying synchronized portions of both the first part and the second part on the display screen of the first electronic device.

20. The method of claim 3, wherein the tempo descriptor is selected from among a group consisting of the words "Presto", "Allegro", "Moderato", "Andante", "Adagio", "Largetto", and "Largo", and abbreviations of the words in the group, and wherein the method further comprises accessing from the electronic storage location an indicator of a predetermined range of musical beats per unit of time associated with the tempo descriptor selected from among the group.

21. The method of claim 3, wherein the method further comprises accessing from the electronic storage location an indicator of a specified modification of an earlier tempo associated with the tempo descriptor.

22. The method of claim 21, wherein the tempo descriptor is selected from among a group consisting of the words "Ritardando", "Accelerando", "Stringendo", and "Rallentando", and abbreviations of the words in the group, and wherein the method further comprises accessing from the electronic storage location an indicator of a specified modification of an earlier tempo associated with the tempo descriptor selected from among the group.

23. The method of claim 12, wherein receiving the second electronic input comprises receiving a handwriting input, and applying a handwriting recognition method to the handwriting input to derive the second electronic input.

24. A computer-readable storage medium comprising instructions for causing one or more processors to:
derive a first electronic input that indicates timing information for a musical composition using character analysis or pattern recognition on sheet music for the musical composition, wherein the sheet music for the musical composition comprises one or more of: musical tempo words, tempo defining symbols, and flow-altering indicia;
determine a timing parameter for the musical composition using the first electronic input indicating the timing information;
partition the musical composition into a plurality of portions that define a different partitioning than an original form of the sheet music for the musical composition, comprising at least a first portion and a second portion, wherein the partitioning of the musical composition is based at least in part on the timing parameter for the musical composition, the complexity of the musical composition or of one or more portions of the musical composition, and a size of a display screen of a first electronic device;
determine a time duration associated with the first portion based at least in part on the timing parameter for the musical composition and the partitioning of the musical composition;
display, on the display screen of the first electronic device, sheet music for the first portion of the plurality of portions of the musical composition; and
display, on the display screen of the first electronic device, sheet music for the second portion of the plurality of portions of the musical composition following an expiration of the time duration associated with the first portion.

25. The computer-readable storage medium of claim 24, wherein the first electronic input indicates a number of musical beats, wherein the number of musical beats is to be played over a length of time.

26. The computer-readable storage medium of claim 24, wherein the first electronic input indicates a tempo descriptor comprising a word, an abbreviation, or a phrase, and further comprising instructions for causing the one or more processors to access from an electronic storage location an indicator of a predetermined number or range of musical beats per unit of time associated with the tempo descriptor.

27. The computer-readable storage medium of claim 24, wherein the timing parameter indicates a time-per-musical-beat for the musical composition, and wherein determining the timing parameter comprises dividing a time period by a number of musical beats.

28. The computer-readable storage medium of claim 27, wherein determining the time duration for the first portion comprises multiplying the time-per-musical-beat for the musical composition by a number of musical beats associated with the first portion.

29. The computer-readable storage medium of claim 27, wherein the time duration for the first portion indicates a time duration of one measure of the musical composition, and wherein determining the time duration of the one measure of the musical composition comprises multiplying the time-per-musical-beat for the musical composition by a number of musical beats per measure of the musical composition.

30. The computer-readable storage medium of claim 24, further comprising instructions for causing the one or more processors to display on the first electronic device an indicator of position within the portion of the musical composition displayed on the first electronic device.

31. The computer-readable storage medium of claim 24, wherein the second portion of the musical composition is contiguous with the first portion of the musical composition.

32. The computer-readable storage medium of claim 24, wherein the second portion of the musical composition is not contiguous with the first portion of the musical composition, and wherein the second portion precedes the first portion within the musical composition.

33. The computer-readable storage medium of claim 24, wherein the display of sheet music for the first portion is discontinued following the expiration of the time duration.

34. The computer-readable storage medium of claim 24, wherein the display of sheet music for a subset of the first portion is continued following the expiration of the time duration, with the first portion moving leftward, overlapping display of at least a subset of the sheet music for the second portion, as the second portion moves leftward and replaces the first portion.

35. The computer-readable storage medium of claim 24, further comprising instructions for causing the one or more processors to:
receive a second electronic input that indicates a comment related to the sheet music for the first portion; and
transmit an electronic message for receipt by a second electronic device, wherein the electronic message instructs the second electronic device to display the comment related to the sheet music for the first portion.

36. The computer-readable storage medium of claim 24, further comprising instructions for causing the one or more processors to transmit an electronic message for receipt by a second electronic device, wherein the electronic message is used by the second electronic device to synchronize with the electronic device.

37. An electronic device, comprising:
means for deriving a first electronic input that indicates timing information for a musical composition using character analysis or pattern recognition on sheet music for the musical composition, wherein the sheet music for the musical composition comprises one or more of: musical tempo words, tempo defining symbols, and flow-altering indicia;
means for determining a timing parameter for the musical composition using the first electronic input indicating the timing information;
means for partitioning the musical composition into a plurality of portions that define a different partitioning than an original form of the sheet music for the musical composition, comprising at least a first portion and a second portion, wherein the partitioning of the musical composition is based at least in part on the timing parameter for the musical composition, the complexity of the musical composition or of one or more portions of the musical composition, and a size of a display screen of the electronic device;
means for determining a time duration associated with the first portion based at least in part on the timing parameter for the musical composition and the partitioning of the musical composition;
means for displaying, on the display screen of the electronic device, sheet music for the first portion of the plurality of portions of the musical composition; and
means for displaying, on the display screen of the electronic device, sheet music for the second portion of the plurality of portions of the musical composition following an expiration of the time duration associated with the first portion.

38. The electronic device of claim 37, wherein the first electronic input indicates a number of musical beats, wherein the number of musical beats is to be played over a length of time.

39. The electronic device of claim 37, wherein the first electronic input indicates a tempo descriptor comprising a word, an abbreviation, or a phrase, and further comprising means for accessing from an electronic storage location an indicator of a predetermined number or range of musical beats per unit of time associated with the tempo descriptor.

40. The electronic device of claim 37, wherein the timing parameter indicates a time-per-musical-beat for the musical composition, and wherein determining the timing parameter comprises dividing a time period by a number of musical beats.

41. The electronic device of claim 40, wherein determining the time duration for the first portion comprises multiplying the time-per-musical-beat for the musical composition by a number of musical beats associated with the first portion.

42. The electronic device of claim 40, wherein the time duration for the first portion indicates a time duration of one measure of the musical composition, and wherein determining the time duration of the one measure of the musical composition comprises multiplying the time-per-musical-beat for the musical composition by a number of musical beats per measure of the musical composition.

43. The electronic device of claim 37, further comprising means for displaying on the electronic device an indicator of position within the portion of the musical composition displayed on the electronic device.

44. The electronic device of claim 37, wherein the second portion of the musical composition is contiguous with the first portion of the musical composition.

45. The electronic device of claim 37, wherein the second portion of the musical composition is not contiguous with the first portion of the musical composition, and wherein the second portion precedes the first portion within the musical composition.

46. The electronic device of claim 37, wherein the display of sheet music for the first portion is discontinued following the expiration of the time duration.

47. The electronic device of claim 37, wherein the display of sheet music for a subset of the first portion is continued following the expiration of the time duration, with the first portion moving leftward, overlapping display of at least a subset of the sheet music for the second portion, as the second portion moves leftward and replaces the first portion.

48. The electronic device of claim 37, further comprising means for:
receiving a second electronic input that indicates a comment related to the sheet music for the first portion; and
transmitting an electronic message for receipt by a second electronic device, wherein the electronic message instructs the second electronic device to display the comment related to the sheet music for the first portion.

49. The electronic device of claim 37, further comprising means for transmitting an electronic message for receipt by a second electronic device, wherein the electronic message is used by the second electronic device to synchronize with the electronic device.

50. An electronic device, comprising:
one or more processors;
a display screen;
a first module operable by the one or more processors to derive a first electronic input that indicates timing information for a musical composition, wherein the musical composition comprises one or more of: musical tempo words, tempo defining signals, and flow-altering indicia;
a second module operable by the one or more processors to determine a timing parameter for the musical composition using the first electronic input that indicates the timing information;
a third module operable by the one or more processors to determine a partitioning of the musical composition into a plurality of portions that define a different partitioning than an original form of the sheet music for the musical composition, comprising at least a first portion and a second portion, wherein the partitioning of the musical composition is based at least in part on the timing parameter for the musical composition, the complexity of the musical composition or of one or more portions of the musical composition, and a size of the display screen, the third module being further operable by the one or more processors to determine a time duration associated with the first portion of the plurality of portions of the musical composition based at least in part on the timing parameter for the musical composition and the partitioning of the musical composition; and
a fourth module operable by the one or more processors to display, on the display screen, sheet music for the first portion of the musical composition, and to display, on the display screen, sheet music for the second portion of the plurality of portions of the musical composition following an expiration of the time duration associated with the first portion.

51. The electronic device of claim 50, wherein the first electronic input indicates a number of musical beats, wherein the number of musical beats is to be played over a length of time.

52. The electronic device of claim 50, wherein the first electronic input indicates a tempo descriptor comprising a word, an abbreviation, or a phrase, and further comprising a fifth module operable by the one or more processors to access from an electronic storage location an indicator of a predetermined number or range of musical beats per unit of time associated with the tempo descriptor.

53. The electronic device of claim 50, wherein the timing parameter indicates a time-per-musical-beat for the musical composition, and wherein determining the timing parameter comprises dividing a time period by a number of musical beats.

54. The electronic device of claim 53, wherein determining the time duration for the first portion comprises multiplying the time-per-musical-beat for the musical composition by a number of musical beats associated with the first portion.

55. The electronic device of claim 53, wherein the time duration for the first portion indicates a time duration of one measure of the musical composition, and wherein determining the time duration of the one measure of the musical composition comprises multiplying the time-per-musical-beat for the musical composition by a number of musical beats per measure of the musical composition.

56. The electronic device of claim 50, further comprising a fifth module operable by the one or more processors to display on the electronic device an indicator of position within the portion of the musical composition displayed on the electronic device.

57. The electronic device of claim 50, wherein the second portion of the musical composition is contiguous with the first portion of the musical composition.

58. The electronic device of claim 50, wherein the second portion of the musical composition is not contiguous with the first portion of the musical composition, and wherein the second portion precedes the first portion within the musical composition.

59. The electronic device of claim 50, wherein the display of sheet music for the first portion is discontinued following the expiration of the time duration.

60. The electronic device of claim 50, wherein the display of sheet music for a subset of the first portion is continued following the expiration of the time duration, with the first portion moving leftward, overlapping display of at least a subset of the sheet music for the second portion, as the second portion moves leftward and replaces the first portion.

61. The electronic device of claim 50, further comprising a fifth module operable by the one or more processors to:
receive a second electronic input that indicates a comment related to the sheet music for the first portion; and
transmit an electronic message for receipt by a second electronic device, wherein the electronic message instructs the second electronic device to display the comment related to the sheet music for the first portion.

62. The electronic device of claim 50, further comprising a fifth module operable by the one or more processors to transmit an electronic message for receipt by a second electronic device, wherein the electronic message is used by the second electronic device to synchronize with the electronic device.

63. The electronic device of claim 50, wherein the display screen of the electronic device comprises an e-ink display screen.

64. The electronic device of claim 50, wherein the display screen of the electronic device comprises a foldable display.

65. The electronic device of claim 50, wherein the electronic device is integrated with a musical instrument, and the display screen of the electronic device is inset in the musical instrument.

66. The electronic device of claim 50, further comprising a microphone, and a fourth module operable by the one or more processors to sense a performance of the musical composition via the microphone, and automatically synchronize the displaying of the sheet music based on the performance of the musical composition as sensed via the microphone.

* * * * *